United States Patent
Sundararaman et al.

(12)

(10) Patent No.: US 12,430,509 B1
(45) Date of Patent: *Sep. 30, 2025

(54) CONTEXTUAL NATURAL LANGUAGE CENSORING

(71) Applicant: Amazon Technologies, Inc., Seattle, WA (US)

(72) Inventors: Arunachalam Sundararaman, Redmond, WA (US); Mukul Aggarwal, Narnaul (IN); Rajesh Ravindran Nandyaleth, Bellevue, WA (US); Ankur Gupta, Bellevue, WA (US); Dilip Sridhar, Bangalore (IN)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/378,887

(22) Filed: Oct. 11, 2023

Related U.S. Application Data

(63) Continuation of application No. 16/429,752, filed on Jun. 3, 2019, now Pat. No. 11,822,885.

(51) Int. Cl.
*G06F 40/279* (2020.01)
*G06F 16/334* (2025.01)

(52) U.S. Cl.
CPC ........ *G06F 40/279* (2020.01); *G06F 16/3344* (2019.01)

(58) Field of Classification Search
None
See application file for complete search history.

(56) References Cited

U.S. PATENT DOCUMENTS

| | | | |
|---|---|---|---|
| 9,461,958 B1 | 10/2016 | Green et al. | |
| 11,822,885 B1* | 11/2023 | Sundararaman | .... G06F 16/3344 |
| 2009/0228557 A1 | 9/2009 | Ganz et al. | |
| 2010/0082332 A1 | 4/2010 | Angell | |
| 2012/0265744 A1 | 10/2012 | Berkowitz et al. | |

(Continued)

OTHER PUBLICATIONS

Office Action for U.S. Appl. No. 16/429,752, Mailed on Feb. 10, 2023, Inventor #1 Arunachalam Sundararaman, 'Contextual Natural Language Censoring', 44 pages.

(Continued)

*Primary Examiner* — Nicole A K Schmieder
(74) *Attorney, Agent, or Firm* — Eversheds Sutherland (US) LLP

(57) ABSTRACT

Systems and methods for contextual natural language censoring are disclosed. For example, configuration data indicating details associated with content provided by a client device and/or about the client device may be received and may be utilized to determine impermissible and permissible exceptions for a given client. One or more queries may be generated utilizing the impermissible and permissible exceptions, and when input data is received from the client device and/or in association with the client identifier, the queries may be utilized to evaluate the input data for impermissible and permissible exceptions. The results may be filtered based on user preferences, the input data may be censored, the input data may be prevented from being exposed to a user device, the application associated with the input data may be removed from availability, and/or a maturity setting may be changed for the application, for example.

20 Claims, 10 Drawing Sheets

(56) References Cited

U.S. PATENT DOCUMENTS

| | | |
|---|---|---|
| 2013/0339020 A1 | 12/2013 | Heo et al. |
| 2014/0019137 A1 | 1/2014 | Kitagishi |
| 2014/0278367 A1 | 9/2014 | Markman et al. |
| 2016/0119713 A1* | 4/2016 | Knox .................. G06V 20/593 |
| | | 381/71.1 |
| 2017/0041454 A1 | 2/2017 | Nicholls et al. |
| 2018/0063192 A1 | 3/2018 | Mcguire et al. |
| 2018/0131645 A1* | 5/2018 | Magliozzi ............... G06F 40/30 |
| 2019/0164539 A1 | 5/2019 | Schmidt et al. |
| 2019/0235831 A1 | 8/2019 | Bao |

OTHER PUBLICATIONS

Office Action for U.S. Appl. No. 16/429,752, mailed on May 7, 2021, Sundararaman, "Contextual Natural Language Censoring" 39 pages.

Office Action for U.S. Appl. No. 16/429,752, mailed on Dec. 22, 2020, Sundararaman, "Contextual Natural Language Censoring", 37 Pages.

Office Action for U.S. Appl. No. 16/429,752, mailed Feb. 15, 2022, Sundararaman, "Contextual Natural Language Censoring", 40 pages.

* cited by examiner

CONTEXTUAL NATURAL LANGUAGE CENSORING

PRIORITY

This patent application is a continuation of, and claims priority to, U.S. patent application Ser. No. 16/429,752, filed on Jun. 3, 2019, entitled "Contextual Natural Language Censoring,", which is fully incorporated by reference herein.

BACKGROUND

Use of electronic devices to perform actions and/or to retrieve information has become ubiquitous. Electronic devices receive input representing requests to perform actions, and, for example, output audio and text in response to such requests. Described herein are improvements in technology and solutions to technical problems that can be used to, among other things, control output of audio and/or text responses on electronic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
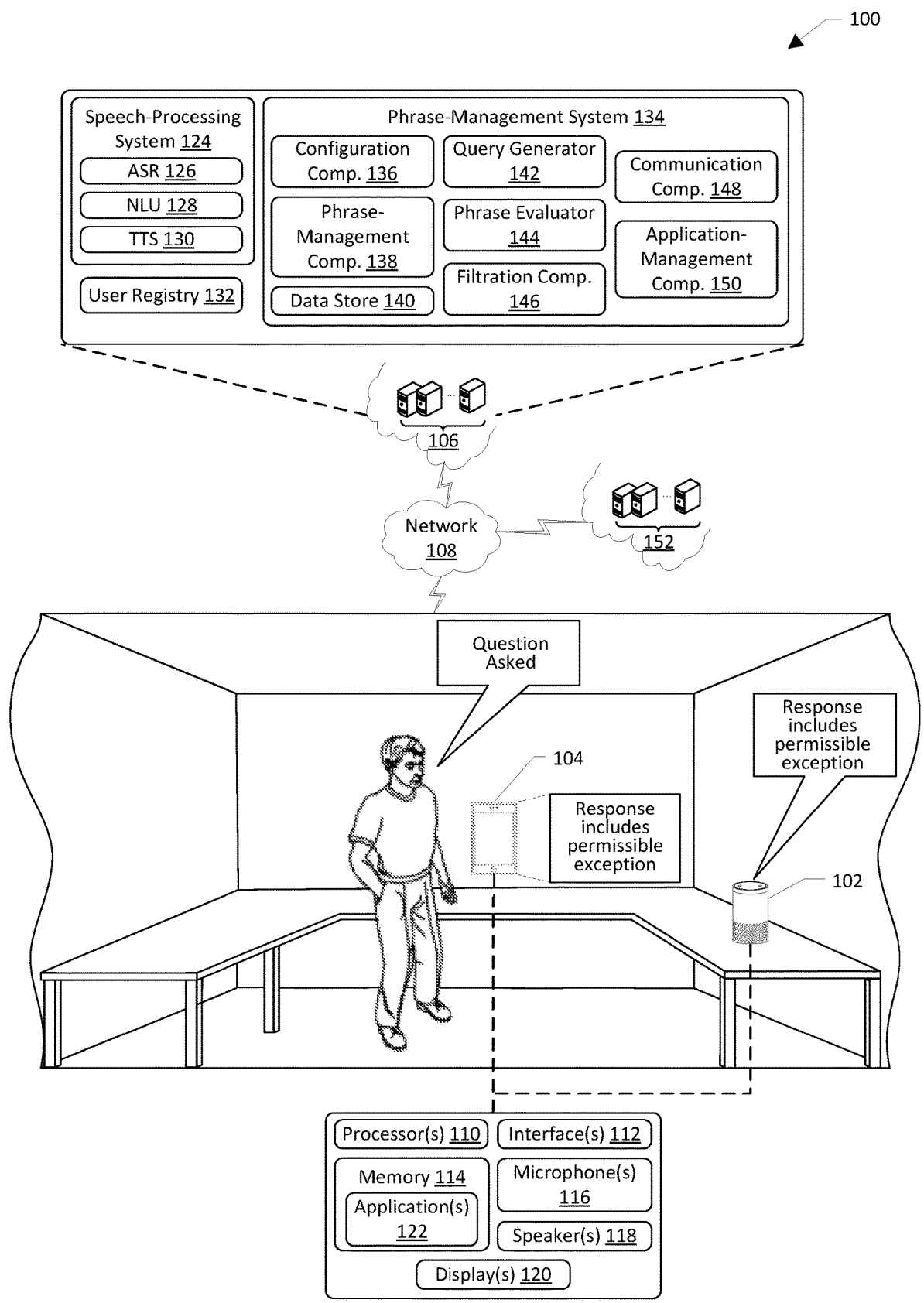
FIG. 1 illustrates a schematic diagram of an example environment for contextual natural language censoring.

Systems and methods for contextual natural language censoring are disclosed. Take, for example, an environment that includes one or more electronic devices, such as voice-enabled devices and/or personal devices such as mobile phones. A user of an electronic device may desire for the electronic device to perform an action, such as retrieving desired information, operating smart-home devices, playing music, etc. For example, a user may speak a user utterance requesting information. The electronic device may capture audio representing the user utterance and generate corresponding audio data. The audio data may be sent from the electronic device to a remote system, which may utilize the audio data to determine that a response including the information is requested. The remote system may identify an application utilized to provide information, and may query that application for the information. In many instances, the application may send data indicating the information and a text-to-speech component of the remote system may generate audio data as a response to the user utterance that indicates the information as provided by the application. However, in examples, the information to be output by the electronic device may include phrases that would violate one or more content policies, such as phrases with curse words, inappropriate content, infringing content, etc. In these examples, it would be beneficial to identify when input data provided by applications, and/or otherwise utilized by the electronic device, includes these impermissible phrases. Additionally, the impermissible phrase may be associated with a permissible exception that would not violate the one or more content policies and would be permitted for output to a user. In instances where an impermissible phrase is identified that does not correspond to a permissible exception, one or more actions may be performed by the remote system, such as censoring of the input data, sending of a communication to a device associated with the application, removal of the application from use by the electronic device, and/or categorization of the application, for example. In stances where the impermissible phrase is identified but a permissible exception is identified, the response may be sent to the electronic device for output.

In examples, a device and/or system utilizing the remote system, otherwise described herein as a client device, may provide configuration data for contextual natural language censoring as described herein. For example, before or upon making the application available to the remote system and/or electronic devices, the client device may be queried for configuration data associated with contextual natural language censoring. This configuration data may include a client identifier that identifies the client and/or client device and/or an input-data type that indicates the type of input data that may be processed by the client device. Examples of input-data types may include customer reviews and/or ratings, responses to requests for information and/or to perform one or more processes, content retrieved by a given client device, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization of the input data. The configuration data may also include phrase-evaluation request methods to be utilized, such as streaming requests and/or application programming interface (API)-based synchronous invocation. The configuration data may also include phrase-evaluation response methods to be utilized, such as simple notification responses and/or batch responses. The configuration data may also include filtration preferences, such as preferences for filtering phrase-evaluation results.

The configuration data may be utilized by a phrase-management component of the remote system to identify and/or determine impermissible phrases. The system may also identify and/or determine a phrase as being a permissible exception of what would otherwise be an impermissible phrase. For example, certain previously-defined impermissible phrases and permissible exceptions may be associated with given input-data types and/or language indicators. In these examples, once an input-data type and/or language indicator is identified and/or received for a given client, that input-data type and/or language indicator may be utilized to identify the impermissible phrases and permissible exceptions associated with that input-data type and/or language indicator. The impermissible phrases may represent phrases that violate one or more policies associated with the application, the client device, the electronic device, and/or the remote system. Such phrases may include those that include curse words, inappropriate and/or explicit content, infringing content, etc. The permissible exceptions may be phrases that are associated with the impermissible phrases but are considered permissible. For example, an impermissible phrase may be "drug." An associated permissible exception may be "drug store," which may be both permissible for a given context and/or category of phrases. Additionally, even when a word may be considered impermissible in given circumstances, when the content is of a given type, such as a literary work, the impermissible phrase may be considered permissible. The phrase-management component may also be utilized to determine phrase-evaluation preferences, such as whether a phrase will be considered an impermissible phrase or a permissible exception when there is an exact match, a broad-phrase match, a fuzzy match, and/or a phonetic match. The impermissible phrases, permissible exceptions, associated metadata, and/or configuration data may be stored in a data store to be utilized for contextual natural language censoring.

A query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible exception or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store and/or may be stored in a separate database for contextual natural language censoring operations.

The remote system may then receive input data from the client device. The remote system may receive an indication of the client identifier in association with the input data and may utilize the client identifier to determine which queries are to be utilized for phrase evaluation. The queries corresponding to the client identifier may be retrieved and may be utilized to determine whether impermissible phrases and/or permissible exceptions are present in the input data. Prior to phrase evaluation, the input data may be pre-processed utilizing the pre-processing preferences described with respect to the configuration data. The input data may be percolated into a percolator query and may be analyzed in association with the phrase-evaluation query associated with the client identifier. A phrase evaluator may perform the evaluation of the percolator query to identify impermissible phrases and permissible exceptions associated with the input data. The phrase evaluator may generate evaluation results, which may identify the impermissible phrase(s) and/or permissible exception(s) that were identified, as well as, in examples, a count for some or each of the phrases.

A filtration component of the remote system may receive the evaluation results and may perform one or more filtration processes based at least in part on the filtration preferences described with respect to the configuration data. For example, when filtration is not preferred, the filtration component may not filter or otherwise generate filtered results from the evaluation results. In other examples, the filtration preferences may indicate that impermissible phrases, but not permissible exceptions, are to be returned. In still other examples, the filtration preferences may indicate that identified permissible exceptions corresponding to impermissible phrases are to be nullified such that impermissible phrase counts do not include impermissible phrases that correspond to permissible exceptions. In still other examples, the filtration preferences may indicate that the input data is to be rerun through the phrase evaluator after removing permissible exceptions. In this example, the portions of the input data corresponding to permissible exceptions may be removed from the input data and a second instance of the input data without the permissible exceptions may be rerun through the phrase evaluator. The evaluation results from this phrase evaluation may be considered the final results to be returned.

Additionally, or alternatively, the remote system may include a communication component that may be configured to generate and/or send one or more communications to the client device and/or the electronic device. For example, the communication component may be configured to send the evaluation results and/or the filtered evaluation results to the client device. The communication component may also be configured to generate and/or send a notification to the client device that the application providing input data is associated with input data that includes impermissible phrases and request that corrective action be taken. The communication component may also be configured to send audio data and/or text data to the electronic device indicating that a response from the application is being censored for violating one or more content policies. The response may also be a censored version of the input data received from the client device.

Additionally, or alternatively, the remote system may be configured to determine phrase categories associated with given impermissible phrases. The phrase categories may be associated with actions to be performed by the remote system when phrases associated with those phrase categories are identified in the input data. For example, when the impermissible phrases are associated with a first phrase category, the remote system may determine that a notification is to be sent to the client device. When the impermissible phrases are associated with a second phrase category, the remote system may determine that the application is to be removed from a list of applications accessible by the electronic device. When the impermissible phrases are associated with a third phrase category, the remote system may determine that the application is to be associated with a maturity level indicating that content from the application would not be appropriate for certain age ranges and/or user preferences.

Additionally, or alternatively, the remote system may be configured to utilize the evaluation results and/or filtered evaluation results to generate additional and/or differing queries for subsequent phrase evaluation. For example, if a given impermissible phrase is identified frequently and/or more frequently than other impermissible phrases, the query may be altered to include additional related impermissible phrases to the impermissible phrase in question and/or additional and/or differing permissible exceptions may be associated with the impermissible phrase. Additionally, client feedback data from the evaluation results may be received and may be utilized to alter the n-ary phrase tree for a given client identifier. For example, the feedback data may indicate that a given impermissible phrase is to be removed from the n-ary phrase tree. In these examples, the impermissible phrase, as well as any associated permissible exceptions that are not otherwise associated with another impermissible phrase may be removed from the n-ary phrase tree.

Additionally, the systems and processes described herein may be configured as an interface and/or filter between content provided by a client and/or client application and data and/or information provided to a user device. For example, when a user requests information, such as by a user utterance spoken to a voice-enabled device, a remote system may identify an application configured to service the request. In these examples, the remote system may call to that the application to provide the requested information and may receive data corresponding to the requested information from the application. At this point, the remote system may perform the contextual natural language censoring described herein to determine whether the requested information includes impermissible words that violate one or more content policies and/or permissible exceptions that are associated with such impermissible words. When such as phrase evaluation reveals that impermissible words are identified without corresponding permissible exceptions, the requested information may be censored and/or notifications of the results of the phrase evaluation may be sent to the client device associated with the application and/or to the user device. Additional and/or different action may be performed when impermissible phrases are identified, as described in more detail below.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for contextual natural language censoring. The system 100 may include, for example, a voice-enabled device 102. The voice-enabled device 102 may be configured to receive user utterances and perform operations in response to such user utterances. In these examples, the voice-enabled device 102 may be "hands free" such that interactions with the device are performed through audible requests and responses.

The system 100 may also include a personal device 104, which may include a mobile phone, tablet, laptop, and/or other computing device. The voice-enabled device 102 and/or the personal devices 104 may be configured to send data to and/or receive data from a remote system 106, such as via a network 108. In examples, the voice-enabled device 102 and/or the personal device 104 may communicate directly with the system 106, via the network 108. Additionally, it should be understood that a given space may include numerous voice-enabled devices 102 and/or personal devices 104.

The voice-enabled device 102 and/or the personal device 104 may include one or more components, such as, for example, one or more processors 110, one or more network interfaces 112, memory 114, one or more microphones 116, one or more speakers 118, and/or one or more displays 120. The microphones 116 may be configured to capture audio, such as user utterances, and generate corresponding audio data. The speakers 118 may be configured to output audio, such as audio corresponding to audio data received from another device and/or the system 106. It should be understood that while several examples used herein include a voice-enabled device 102 that allows users to interact therewith via user utterances, one or more other devices, which may not include a voice interface, may be utilized instead of or in addition to voice-enabled devices 102. In these examples, the device may be configured to send and receive data over the network 108 and to communicate with other devices in the system 100. As such, in each instance where a voice-enabled device is utilized, a computing device that does not include a voice interface may also or alternatively be used. The displays 120 may be configured to display media, such as text, corresponding to media data and/or input data that may be received, for example, from the remote system 106. The memory 114 may include one or more components such as, for example, one or more applications 122 residing on the memory 114 and/or accessible to the voice-enabled device 102 and/or the personal device 104. The applications(s) 122 may be configured to cause the processor(s) 110 to receive information associated with interactions with the voice-enabled device 102 and cause display of representations, such as text and/or images, associated with the interactions. The application(s) 122 may also be utilized, in examples, to receive input, such as from a user of the personal device 104, and send corresponding data and/or instructions associated with the input to the remote system 106. The application(s) 122 may also be utilized to display notifications and/or alerts received, for example, from the remote system 106. It should be understood that when voice-enabled devices are described herein, those voice-enabled devices may include phones, computers, and/or other computing devices.

The remote system 106 may include components such as, for example, a speech-processing system 124, a user registry 133, and/or a phrase-management system 134. It should be understood that while the speech-processing system 124, the user registry 132, and the phrase-management system 134 are depicted as separate from each other in FIG. 1, some or all of the components may be a part of the same system. The speech-processing system 124 may include an automatic speech recognition component (ASR) 126, a natural language understanding component (NLU) 128, and/or a test-to-speech component (TTS) 130. The phrase-management system 134 may include a configuration component 136, a phrase-management component 138, a data store 140, a query generator 142, a phrase evaluator 144, a filtration component 146, a communication component 148, and/or an application-management component 150. Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills and/or may be similar to the applications 122 described with respect to the personal device 104. "Skills," as described herein may be applications and/or may be a subset of an application. For example, a skill may receive data representing an intent. For example, an intent may be determined by the NLU component 128 and/or as determined from user input via a computing device. Skills may be configured to utilize the intent to output data for input to the TTS component 130, a link or other resource locator for audio data, and/or a command to a device, such as the voice-enabled device 102.

In instances where a voice-enabled device 102 is utilized, skills may extend the functionality of accessory devices that can be controlled by user utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection voice interfaces of with voice-enabled devices. The applications(s) may be configured to cause processor(s) to receive information associated with interactions with the voice-enabled device 102. The application(s) may also be utilized, in examples, to receive input, such as from a user of the personal device 104 and/or the voice-enabled device 102, and send data and/or instructions associated with the input to one or more other devices.

The components of the remote system 104 are described in detail below. In examples, some or each of the components of the remote system 106 may include their own processor(s), network interface(s), and/or memory. As such, by way of example, the speech-processing system 124 may include and/or be associated with processor(s), network interface(s), and/or memory. The phrase-management system 134 may include and/or be associated with different processor(s), network interface(s), and/or memory, or one or more of these components may utilize some or all of the same processor(s), network interface(s), and/or memory utilized by the speech-processing system 124. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry component 132 may be configured to identify, determine, and/or generate associations between users, user accounts, and/or devices. For example, one or more associations between user accounts may be identified, determined, and/or generated by the user registry 132. The user registry 132 may additionally store information indicating one or more applications and/or resources accessible to and/or enabled for a given user account. Additionally, the user registry 132 may include information indicating device identifiers, such as naming identifiers, associated with a given user account, as well as device types associated with the device identifiers. The user registry 132 may also include information indicating user account identifiers, naming indicators of devices associated with user accounts, and/or associations between devices, such as the voice-enabled device 102 and the personal device 104. The user registry 132 may also include information associated with usage of the voice-enabled devices 102 and/or the personal device 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The speech-processing system 124 may be configured to receive audio data from the voice-enabled device 102 and perform speech-processing operations. For example, the ASR component 126 may be configured to generate text data corresponding to the audio data, and the NLU component 128 may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "What is the title of this song?," the NLU component 128 may identify a "identify title" intent and the payload may be "this song." In this example where the intent data indicates an intent to provide the title of a song that is currently being output, the speech-processing system 124 may call one or more speechlets to effectuate the intent. Speechlets, as described herein may otherwise be described as applications and may include functionality for utilizing intent data to generate directives and/or instructions. For example, a music speechlet may be called when the intent indicates that an action is to be performed associated with music output by the voice-enabled device 102. The speechlet may be designated as being configured to handle the intent of determining information associated with music, for example. The speechlet may receive the intent data and/or other data associated with the user utterance from the NLU component 128, such as by an orchestrator of the remote system 106, and may perform operations to instruct the voice-enabled device 102 and/or the personal device 104 to perform an operation. For example, the music speechlet may retrieve the requested information and may provide that information to the remote system 106. The remote system may utilize text data associated with the requested information to generate audio data, such as by the TTS component 130. The audio data may be sent from the remote system 106 to the voice-enabled device 102 for output of corresponding audio by the speakers 118 of the voice-enabled device 102.

The configuration component 136 may be configured to identify, determine, and/or generate configuration data for contextual natural language censoring. In examples, a device and/or system utilizing the remote system, otherwise described herein as a client device 152, may provide configuration data for contextual natural language censoring as described herein. For example, before or upon making an application available to the remote system 106 and/or voice-enabled devices 102, the client device 152 may be queried for configuration data associated with contextual natural language censoring. This configuration data may include a client identifier that identifies the client and/or client device and/or an input-data type that indicates the type of input data that may be processed by the client device 152. Examples of input-data types may include customer reviews and/or ratings, responses to requests for information and/or to perform one or more processes, content retrieved by a given client device 152, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods to be utilized, such as simple notification responses and/or batch responses. The configuration data may also include filtration preferences, such as preferences for filtering phrase-evaluation results.

The configuration data may be utilized by the phrase-management component 138 of the remote system 106 to identify and/or determine impermissible phrases and permissible exceptions. For example, based at least in part on the input-data type and/or the language indicator, previously-defined impermissible phrases and permissible exceptions for the same or similar input-data types and/or language identifiers may be utilized. The impermissible phrases may represent phrases that violate one or more policies associated with the application, the client device 152, the voice-enabled device 102, and/or the remote system 106. Such phrases may include those that include curse words, inappropriate and/or explicit content, infringing content, etc. The permissible exceptions may be phrases that are associated with the impermissible phrases but are considered permissible. For example, an impermissible phrase may be "drug." An associated permissible exception may be "drug store," which may be both permissible for a given context and/or category of phrases. The phrase-management component 138 may also be utilized to determine phrase-evaluation preferences, such as whether a phrase will be considered an impermissible phrase or a permissible exception when there is an exact match, a broad-phrase match, a fuzzy match, and/or a phonetic match. The impermissible phrases, permissible exceptions, associated metadata, and/or configuration data may be stored in the data store 140 to be utilized for contextual natural language censoring.

The query generator 142 may retrieve the impermissible phrases, permissible exceptions, metadata, and/or configuration data from the data store 140 and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store 140 and/or may be stored in a separate database for contextual natural language censoring operations.

The phrase evaluator 144 may receive input data from the client device 152 and/or the voice-enabled device 102 and/or the personal device 104. The phrase evaluator 144 may receive an indication of the client identifier in association with the input data and may utilize the client identifier to determine which queries are to be utilized for phrase evaluation. For example, when the queries discussed above are generated, they may include and/or be associated with a client identifier. The client identifier may be a unique identifier, such as a unique sequence of numbers and/or letters, for the client device and/or the client application that provided the configuration data. Thereafter, in examples where a user request is determined to have requested content associated with the client device and/or client application, the client identifier may be determined and the generated queries may be searched to identify one or more queries that are associated with the client identifier in question. Those queries may be retrieved and may be utilized to perform phrase evaluation of the content from the application, as described elsewhere herein. The queries corresponding to the client identifier may be retrieved and may be utilized to determine whether impermissible phrases and/or permissible exceptions are present in the input data. For example, the content may be percolated into a percolator query, which may be used to compare with queries stored in the data store 140. The percolator query may contain the content and/or portions of the content. In these examples, the query may include one or more fields, such as an query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible exceptions associated with those queries and the text data. For example, the queries may indicate one or more impermissible phrases and one or more permissible exceptions. The text data may be searched for the impermissible phrases and permissible exceptions, and if present, the query associated with the identified impermissible phrases and/or permissible exceptions may be identified. The identified query may indicate an association between impermissible phrases and permissible exceptions, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed. The phrase evaluator 144 may generate evaluation results, which may identify the impermissible phrase(s) and/or permissible exception(s) that were identified, as well as, in examples, a count for some or each of the phrases.

The filtration component 146 may receive the evaluation results and may perform one or more filtration processes based at least in part on the filtration preferences described with respect to the configuration data. For example, when filtration is not preferred, the filtration component 146 may not filter or otherwise generate filtered results from the evaluation results. In other examples, the filtration preferences may indicate that impermissible phrases, but not permissible exceptions, are to be returned. In still other examples, the filtration preferences may indicate that identified permissible exceptions corresponding to impermissible phrases are to be nullified such that impermissible phrase counts do not include impermissible phrases that correspond to permissible exceptions. In still other examples, the filtration preferences may indicate that the input data is to be rerun through the phrase evaluator after removing permissible exceptions. In this example, the portions of the input data corresponding to permissible exceptions may be removed from the input data and a second instance of the input data without the permissible exceptions may be rerun through the phrase evaluator 144. The evaluation results from this phrase evaluation may be considered the final results to be returned.

The communication component 148 may be configured to generate and/or send one or more communications to the client device 152 and/or the voice-enabled device 102 and/or the personal device 104. For example, the communication component 148 may be configured to send the evaluation results and/or the filtered evaluation results to the client device 152. The communication component 148 may also be configured to generate and/or send a notification to the client device 152 that the application providing input data is associated with input data that includes impermissible phrases and request that corrective action be taken. The communication component 148 may also be configured to send audio data and/or text data to the voice-enabled device 102 and/or the personal device 104 indicating that a response from the application is being censored for violating one or more content policies. The response may also be a censored version of the input data received from the client device 152.

The application-management component 150 may be configured to determine phrase categories associated with given impermissible phrases. The phrase categories may be associated with actions to be performed by the remote system 106 when phrases associated with those phrase categories are identified in the input data. For example, when the impermissible phrases are associated with a first phrase category, the application-management component 150 may determine that a notification is to be sent to the client device 152, such as by the communication component 148. When the impermissible phrases are associated with a second phrase category, the application-management component 150 may determine that the application is to be removed from a list of applications accessible by the voice-enabled device 102 and/or the personal device 104. When the impermissible phrases are associated with a third phrase category, the application-management component 150 may determine that the application is to be associated with a maturity level indicating that content from the application would not be appropriate for certain age ranges and/or user preferences.

Additionally, or alternatively, the remote system 106 may be configured to utilize the evaluation results and/or filtered evaluation results to generate additional and/or differing queries for subsequent phrase evaluation. For example, if a given impermissible phrase is identified frequently and/or more frequently than other impermissible phrases, the query may be altered and/or a new query may be generated that includes additional related impermissible phrases to the impermissible phrase in question and/or additional and/or differing permissible exceptions may be associated with the impermissible phrase. Additionally, client feedback data from the evaluation results may be received and may be utilized to alter an n-ary phrase tree for a given client identifier. For example, the feedback data may indicate that a given impermissible phrase is to be removed from the n-ary phrase tree. In these examples, the impermissible phrase, as well as any associated permissible exceptions that are not otherwise associated with another impermissible phrase may be removed from the n-ary phrase tree.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the voice-enabled device 102.

As shown in FIG. 1, several of the components of the remote system 106 and the associated functionality of those components as described herein may be performed by one or more of the voice-enabled device 102 and/or the personal device 104. Additionally, or alternatively, some or all of the components and/or functionalities associated with the voice-enabled device 102 and/or the personal device 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or with the polling system and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114 and/or the memory described with respect to the components of the remote system 106 may include volatile and nonvolatile memory, removable and non-removable media implemented in any method or technology for storage of information, such as computer-readable instructions, data structures, program component, or other data. Such memory 114 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 and/or the memory described with respect to the components of the remote system 106 may be implemented as computer-readable storage media ("CRSM"), which may be any available physical media accessible by the processor(s) 110 and/or the processor(s) described with respect to the remote system 106 to execute instructions stored on the memory 114 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project: other UNIX or UNIX-like variants: a variation of the Linux operating system as promulgated by Linus Torvalds: the FireOS operating system from Amazon.com Inc. of Seattle, Washington, USA: the Windows operating system from Microsoft Corporation of Redmond, Washington, USA: LynxOS as promulgated by Lynx Software Technologies, Inc. of San Jose, California: Operating System Embedded (Enea OSE) as promulgated by ENEA AB of Sweden; and so forth.

The network interface(s) 112 and/or the network interface(s) described with respect to the components of the remote system 106 may enable messages between the components and/or devices shown in system 100 and/or with one or more other polling systems, as well as other networked devices. Such network interface(s) 112 and/or the network interface(s) described with respect to the components of the remote system 106 may include one or more network interface controllers (NICs) or other types of transceiver devices to send and receive messages over the network 108.

For instance, each of the network interface(s) 112 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112 and/or the network interface(s) described with respect to the components of the remote system 106 may include a wide area network (WAN) component to enable message over a wide area network.

In some instances, the remote system 106 may be local to an environment associated the voice-enabled devices 102 and/or the personal device 104. For instance, the remote system 106 may be located within one or more of the voice-enabled devices 102, and/or the personal device 104. In some instances, some or all of the functionality of the remote system 106 may be performed by one or more of the voice-enabled devices 102 and/or the personal device 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2:
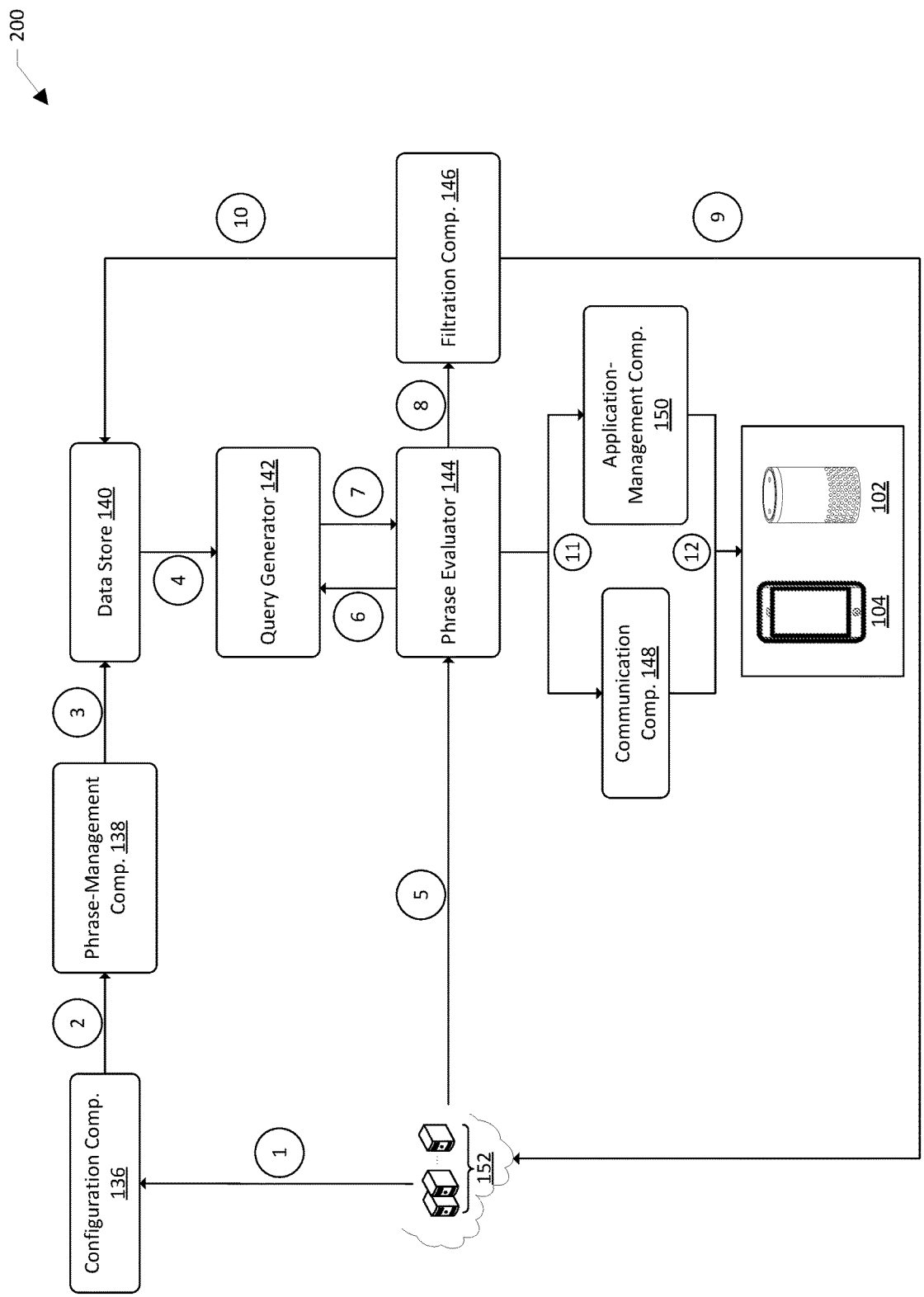
FIG. 2 illustrates a conceptual diagram of example components of a system for contextual natural language censoring.

FIG. 2 illustrates a conceptual diagram of example components of a system 200 for contextual natural language censoring. The system 200 may include the same or similar components as the phrase-management system 134 described with respect to FIG. 1. For example, the system 200 may include a configuration component 136, a phrase-management component 138, a data store 140, a query generator 142, a phrase evaluator 144, a filtration component 146, a communication component 148, and/or an application-management component 150. Additionally, one or more of these components may communicate with other devices and/or systems, such as a client device 152 and/or a voice-enabled device 102 and/or a personal device 104. FIG. 2 depicts the exchange of information and/or the performance of processes via the various components utilizing steps 1-12. However, it should be understood that the processes may be performed in any order and need not be performed in sequential order as depicted in FIG. 2.

At step 1, the client device 152 may provide configuration data to the configuration component 136 for contextual natural language censoring as described herein. For example, before or upon making an application available to a remote system and/or the voice-enabled device 102, the client device 152 may be queried for configuration data associated with contextual natural language censoring. This configuration data may include a client identifier that identifies the client and/or client device and/or an input-data type that indicates the type of input data that may be processed by the client device 152. Examples of input-data types may include customer reviews and/or ratings, responses to requests for information and/or to perform one or more processes, content retrieved by a given client device 152, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods to be utilized, such as simple notification responses and/or batch responses. The configuration data may also include filtration preferences, such as preferences for filtering phrase-evaluation results. The configuration component 136 may be utilized to receive the configuration data from the client device 152 and/or the configuration component 136 may be configured to identify, determine, and/or generate the configuration data utilizing information received from the client device 152 and/or information about the client device 152 and/or a given application as received from the remote system and/or an external source.

At step 2, the configuration data may be utilized by the phrase-management component 138 to identify and/or determine impermissible phrases and permissible exceptions. For example, based at least in part on the input-data type and/or the language indicator, previously-defined impermissible phrases and permissible exceptions for the same or similar input-data types and/or language identifiers may be utilized. The impermissible phrases may represent phrases that violate one or more policies associated with the application, the client device 152, the voice-enabled device 102, and/or the remote system. Such phrases may include those that include curse words, inappropriate and/or explicit content, infringing content, etc. The permissible exceptions may be phrases that are associated with the impermissible phrases but are considered permissible. For example, an impermissible phrase may be "drug." An associated permissible exception may be "drug store," which may be both permissible for a given context and/or category of phrases. The phrase-management component 138 may also be utilized to determine phrase-evaluation preferences, such as whether a phrase will be considered an impermissible phrase or a permissible exception when there is an exact match, a broad-phrase match, a fuzzy match, and/or a phonetic match.

At step 3, the impermissible phrases, permissible exceptions, associated metadata, and/or configuration data may be stored in the data store 140 to be utilized for contextual natural language censoring. The information stored in the data store 140 may be associated with the client identifier and/or an application identifier such that when the information is requested for phrase evaluation of input data associated with a given client device and/or application, relevant information is retrieved.

At step 4, the query generator 142 may retrieve the impermissible phrases, permissible exceptions, metadata, and/or configuration data from the data store 140 and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store 140 and/or may be stored in a separate database for contextual natural language censoring operations.

At step 5, the phrase evaluator 144 may receive input data from the client device 152 and/or the voice-enabled device 102 and/or the personal device 104. Prior to phrase evaluation, the input data may be pre-processed utilizing the pre-processing preferences described with respect to the configuration data. The input data may be percolated into a percolator query and may be analyzed in association with the phrase-evaluation query associated with the client identifier.

At step 6, the phrase evaluator 144 may receive an indication of the client identifier in association with the input data and may utilize the client identifier to determine which queries are to be utilized for phrase evaluation. The queries corresponding to the client identifier may be retrieved, at step 7, and may be utilized to determine whether impermissible phrases and/or permissible exceptions are present in the input data. The phrase evaluator 144 may perform the evaluation of the percolator query to identify impermissible phrases and permissible exceptions associated with the input data. For example, when the queries discussed above are generated, they may include and/or be associated with a client identifier. The client identifier may be a unique identifier, such as a unique sequence of numbers and/or letters, for the client device and/or the client application that provided the configuration data. Thereafter, in examples where a user request is determined to have requested content associated with the client device and/or client application, the client identifier may be determined and the generated queries may be searched to identify one or more queries that are associated with the client identifier in question. Those queries may be retrieved and may be utilized to perform phrase evaluation of the content from the application, as described elsewhere herein. The queries corresponding to the client identifier may be retrieved and may be utilized to determine whether impermissible phrases and/or permissible exceptions are present in the input data. For example, the content may be percolated into a percolator query, which may be used to compare with queries stored in the data store 140. The percolator query may contain the content and/or portions of the content. In these examples, the query may include one or more fields, such as an query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible exceptions associated with those queries and the text data. For example, the queries may indicate one or more impermissible phrases and one or more permissible exceptions. The text data may be searched for the impermissible phrases and permissible exceptions, and if present, the query associated with the identified impermissible phrases and/or permissible exceptions may be identified. The identified query may indicate an association between impermissible phrases and permissible exceptions, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed. The phrase evaluator 144 may generate evaluation results, which may identify the impermissible phrase(s) and/or permissible exception(s) that were identified, as well as, in examples, a count for some or each of the phrases.

At step 8, the filtration component 146 may receive the evaluation results and may perform one or more filtration processes based at least in part on the filtration preferences described with respect to the configuration data. For example, when filtration is not preferred, the filtration component 146 may not filter or otherwise generate filtered results from the evaluation results. In other examples, the filtration preferences may indicate that impermissible phrases, but not permissible exceptions, are to be returned. In still other examples, the filtration preferences may indicate that identified permissible exceptions corresponding to impermissible phrases are to be nullified such that impermissible phrase counts do not include impermissible phrases that correspond to permissible exceptions. In still other examples, the filtration preferences may indicate that the input data is to be rerun through the phrase evaluator after removing permissible exceptions. In this example, the portions of the input data corresponding to permissible exceptions may be removed from the input data and a second instance of the input data without the permissible exceptions may be rerun through the phrase evaluator 144. The evaluation results from this phrase evaluation may be considered the final results to be returned.

At step 9, the evaluation results and/or the filtered evaluation results may be sent to the client device. For example, one or more communications may be sent to the client device 152, the communications may include the evaluation results and/or the filtered evaluation results. The communication may also include a notification that the application providing input data is associated with input data that includes impermissible phrases and request that corrective action be taken.

At step 10, the evaluation results and/or filtered evaluation results may be sent to the data store 140 and may be utilized to generate additional and/or differing queries for subsequent phrase evaluation. For example, if a given impermissible phrase is identified frequently and/or more frequently than other impermissible phrases, the query may be altered and/or a new query may be generated that includes additional related impermissible phrases to the impermissible phrase in question and/or additional and/or differing permissible exceptions may be associated with the impermissible phrase. Additionally, client feedback data from the evaluation results may be received and may be utilized to alter an n-ary phrase tree for a given client identifier. For example, the feedback data may indicate that a given impermissible phrase is to be removed from the n-ary phrase tree. In these examples, the impermissible phrase, as well as any associated permissible exceptions that are not otherwise associated with another impermissible phrase may be removed from the n-ary phrase tree.

At step 11, the evaluation results and/or the filtered evaluation results may be utilized by the communication component 148 and/or the application-management component 150. For example, the communication component 148 may also be configured, at step 12, to send audio data and/or text data to the voice-enabled device 102 and/or the personal device 104 indicating that a response from the application is being censored for violating one or more content policies. The response may also be a censored version of the input data received from the client device 152.

Returning to step 11, the evaluation results and/or the filtered evaluation results may additionally, or alternatively, be sent to the application-management component 150, which may be configured to determine phrase categories associated with given impermissible phrases. The phrase categories may be associated with actions to be performed by the remote system when phrases associated with those phrase categories are identified in the input data. For example, when the impermissible phrases are associated with a first phrase category, the application-management component may determine that a notification is to be sent, at step 12, to the client device 152. When the impermissible phrases are associated with a second phrase category, the application-management component 150 may determine that the application is to be removed from a list of applications accessible by the voice-enabled device 102 and/or the personal device 104. When the impermissible phrases are associated with a third phrase category, the application-management component 150 may determine that the application is to be associated with a maturity level indicating that content from the application would not be appropriate for certain age ranges and/or user preferences.

Figure 3:
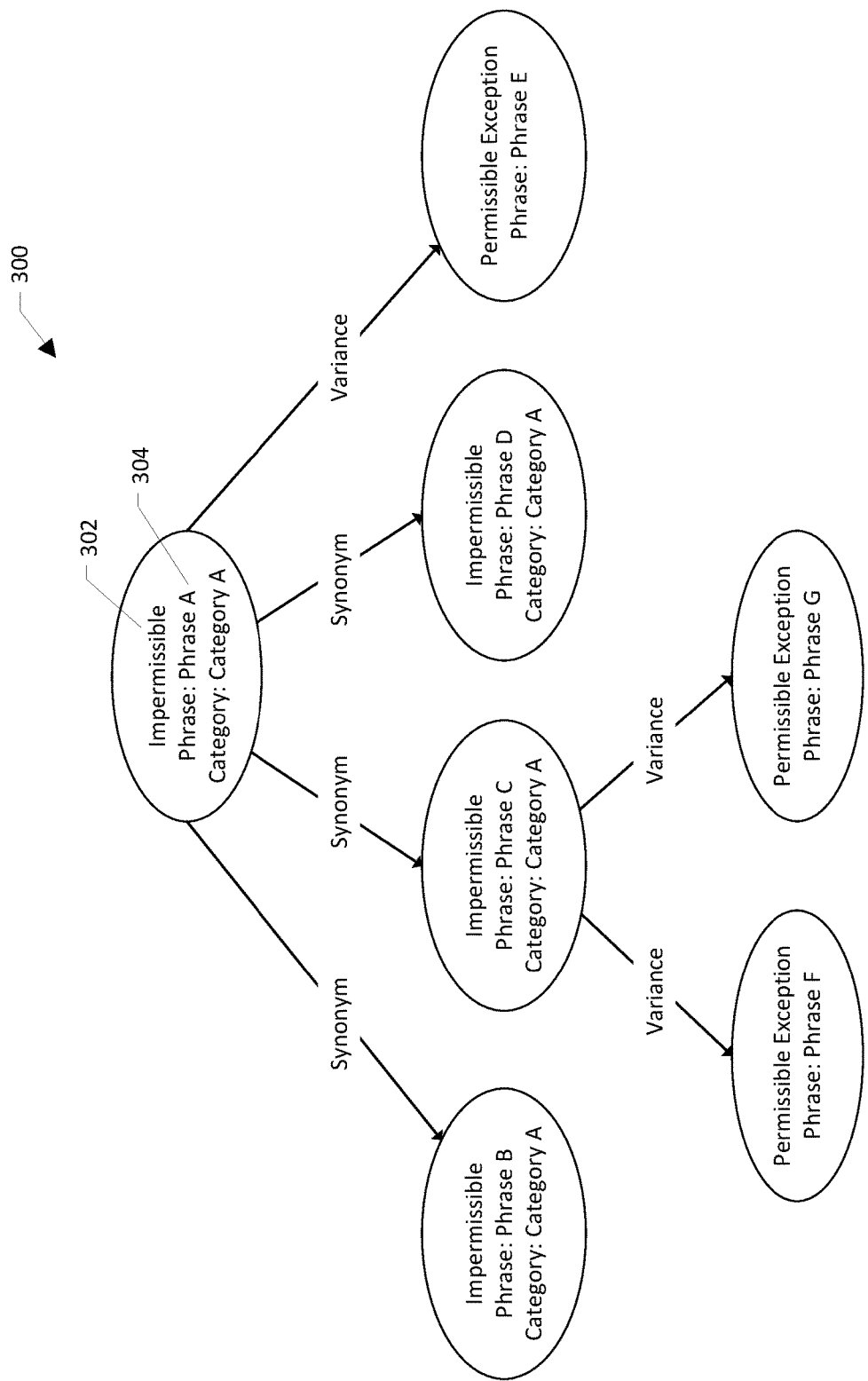
FIG. 3 illustrates a conceptual diagram of an n-ary phrase tree utilized for contextual natural language censoring.

FIG. 3 illustrates a conceptual diagram of an n-ary phrase tree 300 utilized for contextual natural language censoring. The n-ary tree provides a visual representation of associations between phrases, including associations between impermissible phrases and permissible exceptions, between impermissible phrases and impermissible phrases, and/or between permissible exceptions and permissible exceptions.

Using FIG. 3 as an example, several phrases, such as "Phrase A" through "Phrase G" are illustrated as well as a given category associated with a phrase. Examples of these phrases are provided herein by way of example to explain the associations between various phrases. For example, a first impermissible phrase may be "drug," which may be indicated to be an impermissible phrase based at least in part on one or more content policies associated with a user device, a client device that processes information, and/or a remote system that performs contextual natural language censoring. The impermissible phrases may also be indicated by the client devices and may be separate from a specific content policy. Additionally, the impermissible phrases may be based at least in part on a maturity rating and/or level associated with a given application. For example, a "child" maturity rating may be associated with impermissible phrases that would not be associated with an "adult" maturity rating.

Some or all of the nodes in the n-ary phrase tree 300 may include a phrase 302 and a category 304. The phrase 302 may be "drug," and the category 304 may be "illicit material." The category may provide an indication of the content policy and/or rules associated with determining that the phrase 302 is impermissible and/or permissible. Each node of the n-ary phrase tree 300 may be associated with one or more other nodes of the n-ary phrase tree. For example, the impermissible phrase "drug" may be associated with nodes indicting the impermissible phrase "opiate," "narcotic," and "dope," which may be considered synonyms of the parent impermissible phrase. The impermissible phrase may also be associated with nodes indicating permissible exceptions, such as the permissible exception "drug store." Additional and/or differing levels of the n-ary phrase tree 300 may include additional permissible and/or impermissible phrases associated with the parent impermissible phrase. The permissible exceptions may be phrases that are related to and/or are spelled like and/or sound like a given impermissible phrase. For example, the permissible exceptions may represent variances in the impermissible phrases, such as variances in spelling and/or sound of the phrases. Additionally, the permissible exceptions may be those that include a root word that is an impermissible phrase but otherwise do not violate a given content policy.

Determining the impermissible and/or permissible exceptions may be performed utilizing information received from client devices and/or user devices. The information may also be based on historical and/or feedback information indicating commonly-utilized impermissible and/or permissible exceptions. Additionally, an application associated with the client device that provides and/or processes input data may be associated with an application category. The application category may be utilized to determine impermissible phrases and/or permissible exceptions to be utilized. For example, an application associated with a medical application category may not have human body parts listed as impermissible phrases while one or more non-medical applications may have certain human body parts listed as impermissible phrases.

Additionally, or alternatively, the determination of impermissible and permissible exceptions, and the relationships between such phrases may be identified, determined, and/or generated using one or more machine learning models. For example, predictive models may utilize predictive analytic techniques to generate n-ary phrase trees. The predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as for example the data store 140 and may be utilized to predict trends and behavior patterns. In examples, the event, otherwise described herein as an outcome, may be an event that will occur in the future, such as whether a given entity will be involved in defending against a claim associated with intellectual property. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models for future events. By so doing, the predictive models may utilize data as well as features from other systems as described herein, to predict or otherwise determine an outcome. Outcome prediction may be deterministic such that the outcome is determined to occur or not occur. Additionally, or alternatively, the outcome prediction may be probabilistic such that the outcome is determined to occur to a certain probability and/or confidence. The features described herein may be individual measurable properties or characteristics of the observed outcome. A feature may be numeric and/or may include one or more strings and/or graphs. In examples, the feature may correspond to an explanatory variable, such as when statistical techniques are utilized when generating and/or utilizing predictive models. The features may be utilized as inputs by the predictive models to predict the outcome, as described herein. The outcomes may be utilized to determine impermissible phrases, permissible exceptions, and/or associations between impermissible phrases and permissible exceptions.

Figure 4:
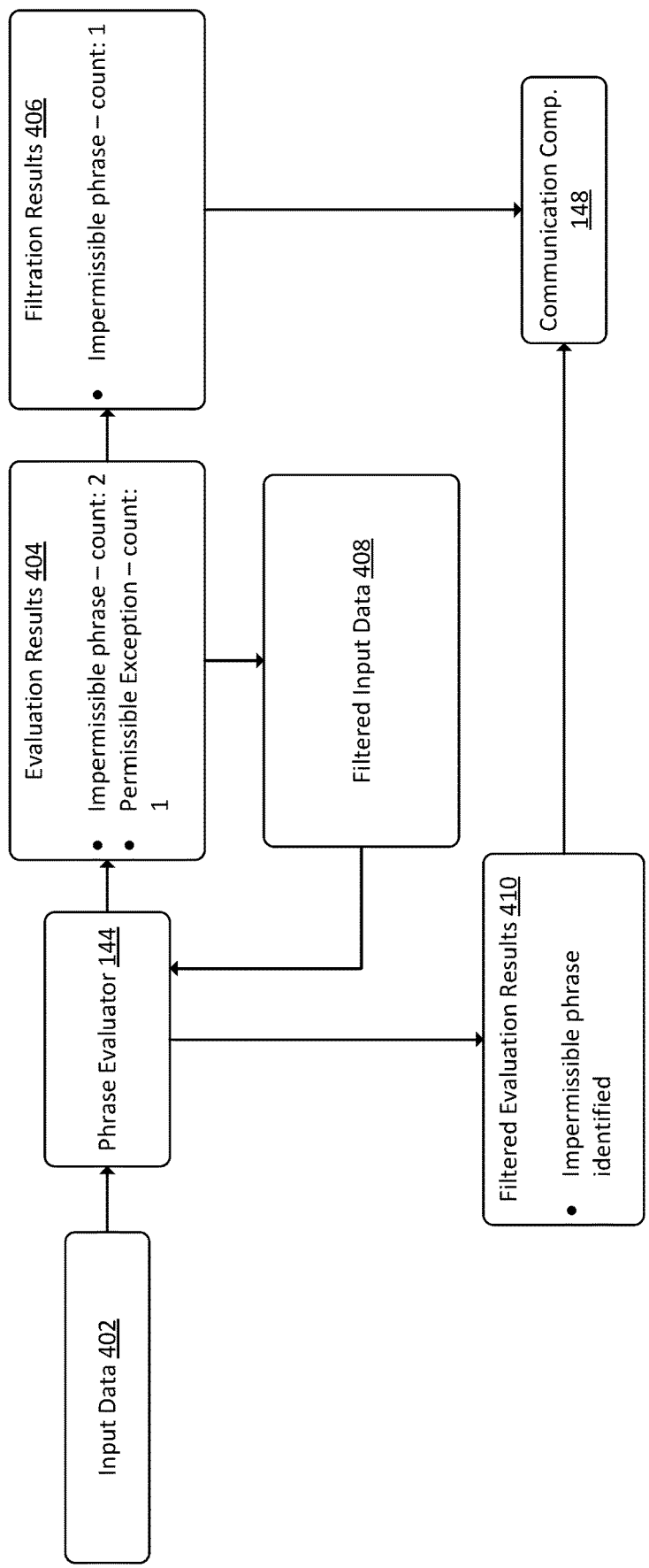
FIG. 4 illustrates example components and information utilized and generated in association with contextual natural language censoring.

FIG. 4 illustrates example components and information utilized and generated in association with contextual natural language censoring.

For example, the phrase evaluator 144 may receive input data 402 from, for example, a client device and/or a voice-enabled device and/or a personal device. Prior to phrase evaluation, the input data 402 may be pre-processed utilizing the pre-processing preferences described with respect to the configuration data. The input data 402 may be percolated into a percolator query and may be analyzed in association with the phrase-evaluation query associated with the client identifier.

The phrase evaluator 144 may receive an indication of the client identifier in association with the input data 402 and may utilize the client identifier to determine which queries are to be utilized for phrase evaluation. The queries corresponding to the client identifier may be retrieved and may be utilized to determine whether impermissible phrases and/or permissible exceptions are present in the input data 402. The phrase evaluator 144 may perform the evaluation of the percolator query to identify impermissible phrases and permissible exceptions associated with the input data 402. For example, the phrase evaluator 144 may search the input data 402 for the impermissible phrases and the permissible exceptions and determine which impermissible phrases and/or permissible exceptions are present and which portions of the input data 402 correspond to the impermissible phrases and/or permissible exceptions. For example, the input data 402 may be "The ability to illegally acquire prescription drugs from local drug stores has been studied." The phrase evaluator 144 may evaluate this input data 402 to determine if any phrases correspond to impermissible and/or permissible exceptions associated with a query for the client identifier.

By way of additional example, when the queries discussed above are generated, they may include and/or be associated with a client identifier. The client identifier may be a unique identifier, such as a unique sequence of numbers and/or letters, for the client device and/or the client application that provided the configuration data. Thereafter, in examples where a user request is determined to have requested content associated with the client device and/or client application, the client identifier may be determined and the generated queries may be searched to identify one or more queries that are associated with the client identifier in question. Those queries may be retrieved and may be utilized to perform phrase evaluation of the content from the application, as described elsewhere herein. The queries corresponding to the client identifier may be retrieved and may be utilized to determine whether impermissible phrases and/or permissible exceptions are present in the input data. For example, the content may be percolated into a percolator query, which may be used to compare with queries stored in the data store 140. The percolator query may contain the content and/or portions of the content. In these examples, the query may include one or more fields, such as an query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible exceptions associated with those queries and the text data. For example, the queries may indicate one or more impermissible phrases and one or more permissible exceptions. The text data may be searched for the impermissible phrases and permissible exceptions, and if present, the query associated with the identified impermissible phrases and/or permissible exceptions may be identified. The identified query may indicate an association between impermissible phrases and permissible exceptions, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed. The phrase evaluator 144 may generate evaluation results, which may identify the impermissible phrase(s) and/or permissible exception(s) that were identified, as well as, in examples, a count for some or each of the phrases.

The phrase evaluator 144 may generate evaluation results 404, which may identify the impermissible phrase(s) and/or permissible exception(s) that were identified, as well as, in examples, a count for some or each of the phrases. For example, the evaluation results 404 may indicate that the phrase "drug" is an impermissible phrase that was present two times in the input data 402, and the phrase "drug store" is a permissible exception that was present one time in the input data 402.

A filtration component may receive the evaluation results 404 and may perform one or more filtration processes based at least in part on the filtration preferences described herein. For example, when filtration is not preferred, the filtration component may not filter or otherwise generate filtered results from the evaluation results. In other examples, the filtration preferences may indicate that impermissible phrases, but not permissible exceptions, are to be returned. In still other examples, the filtration preferences may indicate that identified permissible exceptions corresponding to impermissible phrases are to be nullified such that impermissible phrase counts do not include impermissible phrases that correspond to permissible exceptions. For example, the filtration results 406 may indicate that only one occurrence of "drug" was identified because the instance of "drug" that also corresponds to "drug store" may be nullified or otherwise not included in the results.

In still other examples, the filtration preferences may indicate that the input data 402 is to be rerun through the phrase evaluator after removing permissible exceptions. In this example, the portions of the input data 402 corresponding to permissible exceptions may be removed from the input data 402 and a second instance of the input data, described as filtered input data 408 in FIG. 4, without the permissible exceptions may be rerun through the phrase evaluator 144. Using the example above, the filtered input data 408 may be "The ability to illegally acquire prescription drugs from local BLANK has been studied." This filtered input data 408 may be rerun through the phrase evaluator 144 to generate filtered evaluation results 410, and the filtered evaluation results 410 from this phrase evaluation may be considered the final results to be returned.

The evaluation results and/or the filtered evaluation results 406 and/or the filtered evaluation results 410 may be sent to the client device. For example, one or more communications may be sent to the client device utilizing the communication component 148. The communications may include the results described herein and/or may include a notification that the application providing input data 402 is associated with input data 402 that includes impermissible phrases and request that corrective action be taken.

Figure 5:
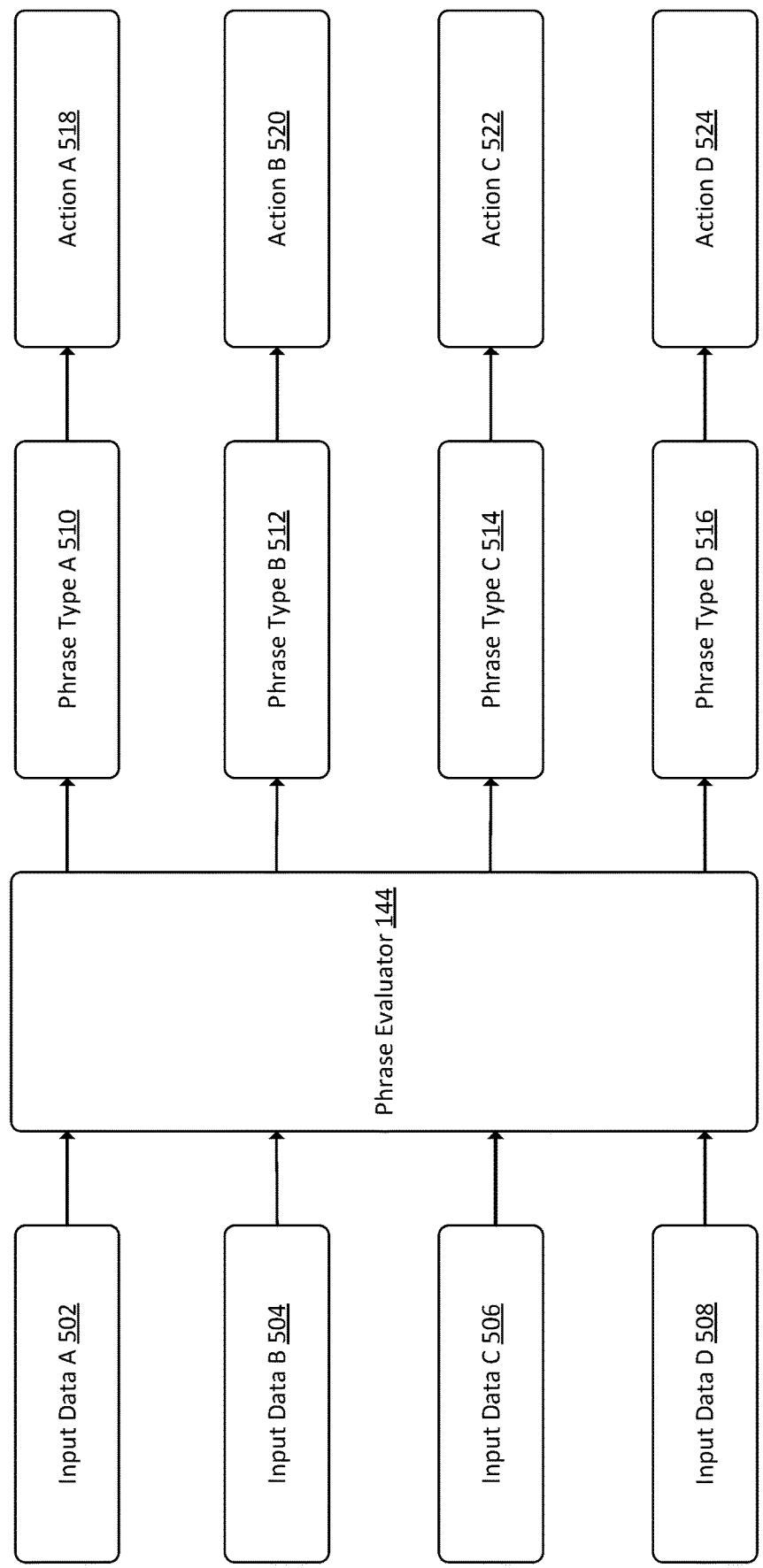
FIG. 5 illustrates the use of various input-data types to perform actions in association with contextual natural language censoring.

FIG. 5 illustrates the use of various input-data types to perform actions in association with contextual natural language censoring. For example, input data, such as media data, audio data, and/or text data may be received by a phrase-management system. The input data may be received from a client device associated with an application accessible using a voice-enabled device and/or a personal device.

In other examples, the input data may be received from the voice-enabled device and/or from the personal device. The input data may be, for example, a customer rating, a customer review, a response to a request from the voice-enabled device and/or the personal device, etc.

As shown in FIG. 5, four instances of input data are depicted as User Input A 502, User Input B 504, User Input C 506, and User Input D 508. It should be understood that these four examples of input data may be the same input data and/or different input data. The various input data may be received and may be utilized as input to a phrase evaluator 144. For example, a client device may provide configuration data to a configuration component for contextual natural language censoring as described herein. Before or upon making an application available to a remote system and/or the voice-enabled device, the client device may be queried for configuration data associated with contextual natural language censoring. This configuration data may include a client identifier that identifies the client and/or client device and/or an input-data type that indicates the type of input data that may be processed by the client device. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods to be utilized, such as simple notification responses and/or batch responses. The configuration data may also include filtration preferences, such as preferences for filtering phrase-evaluation results. The configuration component may be utilized to receive the configuration data from the client device and/or the configuration component may be configured to identify, determine, and/or generate the configuration data utilizing information received from the client device and/or information about the client device and/or a given application as received from the remote system and/or an external source.

The configuration data may be utilized by a phrase-management component to identify and/or determine impermissible phrases and permissible exceptions. For example, based at least in part on the input-data type and/or the language indicator, previously-defined impermissible phrases and permissible exceptions for the same or similar input-data types and/or language identifiers may be utilized. The impermissible phrases may represent phrases that violate one or more policies associated with the application, the client device, the voice-enabled device, and/or the remote system. Such phrases may include those that include curse words, inappropriate and/or explicit content, infringing content, etc. The permissible exceptions may be phrases that are associated with the impermissible phrases but are considered permissible. For example, an impermissible phrase may be "drug." An associated permissible exception may be "drug store," which may be both permissible for a given context and/or category of phrases. The phrase-management component may also be utilized to determine phrase-evaluation preferences, such as whether a phrase will be considered an impermissible phrase or a permissible exception when there is an exact match, a broad-phrase match, a fuzzy match, and/or a phonetic match.

The impermissible phrases, permissible exceptions, associated metadata, and/or configuration data may be stored in a data store to be utilized for contextual natural language censoring. The information stored in the data store may be associated with the client identifier and/or an application identifier such that when the information is requested for phrase evaluation of input data associated with a given client device and/or application, relevant information is retrieved.

A query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store 140 and/or may be stored in a separate database for contextual natural language censoring operations.

The phrase evaluator 144 may receive the input data 502-508 from the client device and/or the voice-enabled device and/or the personal device. Prior to phrase evaluation, the input data 502-508 may be pre-processed utilizing the pre-processing preferences described with respect to the configuration data. The input data 502-508 may be percolated into a percolator query and may be analyzed in association with the phrase-evaluation query associated with the client identifier.

The phrase evaluator 144 may receive an indication of the client identifier in association with the input data and may utilize the client identifier to determine which queries are to be utilized for phrase evaluation. The queries corresponding to the client identifier may be retrieved and may be utilized to determine whether impermissible phrases and/or permissible exceptions are present in the input data. The phrase evaluator 144 may perform the evaluation of the percolator query to identify impermissible phrases and permissible exceptions associated with the input data. For example, when the queries discussed above are generated, they may include and/or be associated with a client identifier. The client identifier may be a unique identifier, such as a unique sequence of numbers and/or letters, for the client device and/or the client application that provided the configuration data. Thereafter, in examples where a user request is determined to have requested content associated with the client device and/or client application, the client identifier may be determined and the generated queries may be searched to identify one or more queries that are associated with the client identifier in question. Those queries may be retrieved and may be utilized to perform phrase evaluation of the content from the application, as described elsewhere herein. The queries corresponding to the client identifier may be retrieved and may be utilized to determine whether impermissible phrases and/or permissible exceptions are present in the input data. For example, the content may be percolated into a percolator query, which may be used to compare with queries stored in the data store 140. The percolator query may contain the content and/or portions of the content. In these examples, the query may include one or more fields, such as an query field used for indexing the query and including a JSON object that represents the query. The query field may be configured as a percolator field type that is configured to store the query in such a way that it can be used to match content defined on the percolator query. The percolator query may be utilized to index the queries associated with the client identifier and percolate the queries to identify which queries match or otherwise correspond to the percolator query. For example, the percolator query may indicate the client identifier for the requested content as well as text data associated with the requested content. Some or all of the queries associated with the client identifier may be utilized to compare the impermissible and permissible exceptions associated with those queries and the text data. For example, the queries may indicate one or more impermissible phrases and one or more permissible exceptions. The text data may be searched for the impermissible phrases and permissible exceptions, and if present, the query associated with the identified impermissible phrases and/or permissible exceptions may be identified. The identified query may indicate an association between impermissible phrases and permissible exceptions, and that association may be utilized to determine whether an impermissible phrase identified in the content also corresponds to a permissible phrase. In examples where the impermissible phrase corresponds to a permissible phrase, the impermissible phrase may not be censored or otherwise counted as an impermissible phrase. In examples where the impermissible phrase does not correspond to a permissible phrase, the impermissible phrase may be counted as an impermissible phrase and the one or more actions described herein, such as censoring, may be performed. The phrase evaluator 144 may generate evaluation results, which may identify the impermissible phrase(s) and/or permissible exception(s) that were identified, as well as, in examples, a count for some or each of the phrases.

Additionally, the phrase evaluator 144 and/or another component of the remote system may identify and/or determine a phrase type associated with given input data. For example, Phrase Type A 510 may correspond to input data that is not identified as an impermissible phrase. In this example, Phrase Type A 510 may be associated with Action A 518, which may be to identify Input Data A 502 as not containing an impermissible phrase. Action A 518 may also be associated with not performing any actions associated with contextual natural language censoring on Input Data A 502. In other examples, Phrase Type B 512 may correspond to input data that includes an impermissible phrase associated with a first level and/or first degree of content-policy violation. In this example, Phrase Type B 512 may be associated with Action B 520, which may be to provide a notification to the client device that Input Data B 512 includes an impermissible phrase and request that corrective action be taken by the client device. In these examples, Action B 520 may additionally or alternatively include causing Input Data B 512 to be censored such that at least the impermissible portion, if not all of Input Data B 512, is removed and/or is not output to the voice-enabled device and/or the personal device.

In other examples, Phrase Type C 514 may correspond to input data that includes an impermissible phrase associated with a second level and/or second degree of content-policy violation that is more violative than the first level and/or first degree. In this example, Phrase Type C 514 may be associated with Action C 522, which may be to disable functionality of the application and/or remove the application from a listing of applications available to the voice-enabled device and/or the personal device. In other examples, Phrase Type D 516 may correspond to input data that includes an impermissible phrase associated with a maturity level that differs from a maturity level currently set in association with the application. In these examples, Phrase Type D 516 may be associated with Action D 524, which may be to change the maturity level associated with the application to an appropriate maturity level. For example, if the application is currently associated with a maturity level indicating everyone may utilize the application, but the input data includes an impermissible phrase such as a curse word, the maturity level may be changed to indicate that only adult users may utilize the application.

Figure 6:
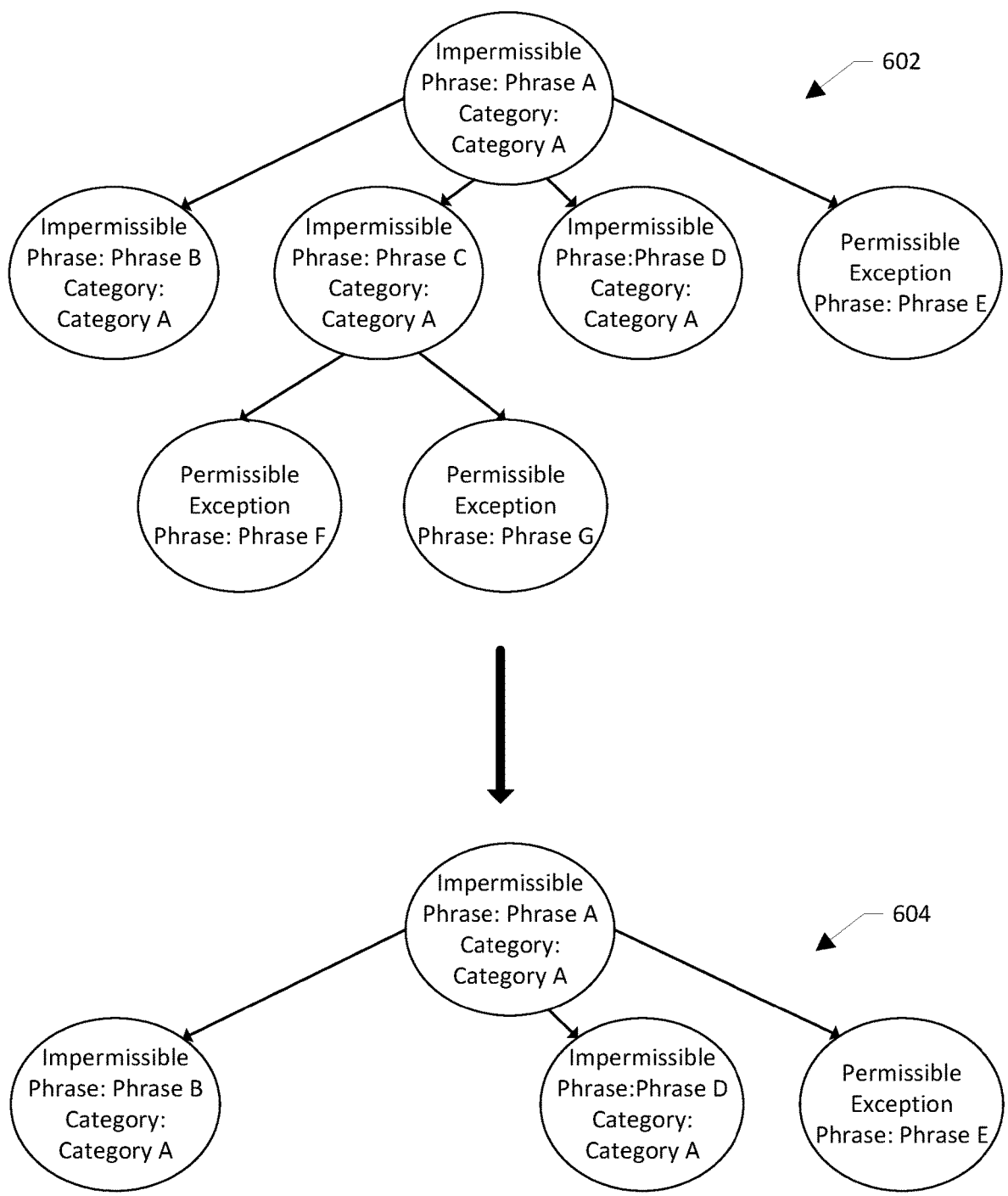
FIG. 6 illustrates the removal of impermissible phrases and associated permissible exceptions from an n-ary phrase tree.

FIG. 6 illustrates the removal of impermissible phrases and associated permissible exceptions from an n-ary phrase tree. For example, a first n-ary phrase tree 602 may include a number of impermissible phrases and permissible exceptions, as well as indicators of relationships between impermissible phrases and other impermissible phrases, and/or impermissible phrases and permissible exceptions, and/or permissible exceptions and other permissible exceptions. The n-ary phrase tree 602 may be the same or similar to the n-ary phrase tree 300 described with respect to FIG. 3.

A phrase-management system may be configured to utilize the evaluation results and/or filtered evaluation results described herein to generate additional and/or differing queries for subsequent phrase evaluation. For example, if a given impermissible phrase is identified frequently and/or more frequently than other impermissible phrases, the query may be altered to include additional related impermissible phrases to the impermissible phrase in question and/or additional and/or differing permissible exceptions may be associated with the impermissible phrase. Additionally, client feedback data from the evaluation results may be received and may be utilized to alter the n-ary phrase tree 602 for a given client identifier. For example, the feedback data may indicate that a given impermissible phrase is to be removed from the n-ary phrase tree 602. In these examples, the impermissible phrase, as well as any associated permissible exceptions that are not otherwise associated with another impermissible phrase may be removed from the n-ary phrase tree 602.

Using FIG. 6 as an example, the evaluation results of a prior phrase evaluation and/or feedback data may be utilized to determine that the impermissible phrase Phrase C is to be removed from the n-ary phrase tree 602. In this example, Phrase C is associated with other nodes of the n-ary phrase tree 602, such as permissible exception Phrase F and permissible exception Phrase G. Based at least in part on these associations and/or that Phrase F and Phrase G are not associated with one or more other parent nodes in the n-ary phrase tree 602, when impermissible phrase Phrase C is removed from the n-ary phrase tree 602, the associated Phrase F and Phrase G may also be removed from the n-ary phrase tree 602. Doing so may result in a second n-ary phrase tree 604 with the impermissible Phrase C and associated Phrase F and Phrase G removed.

Figure 7:
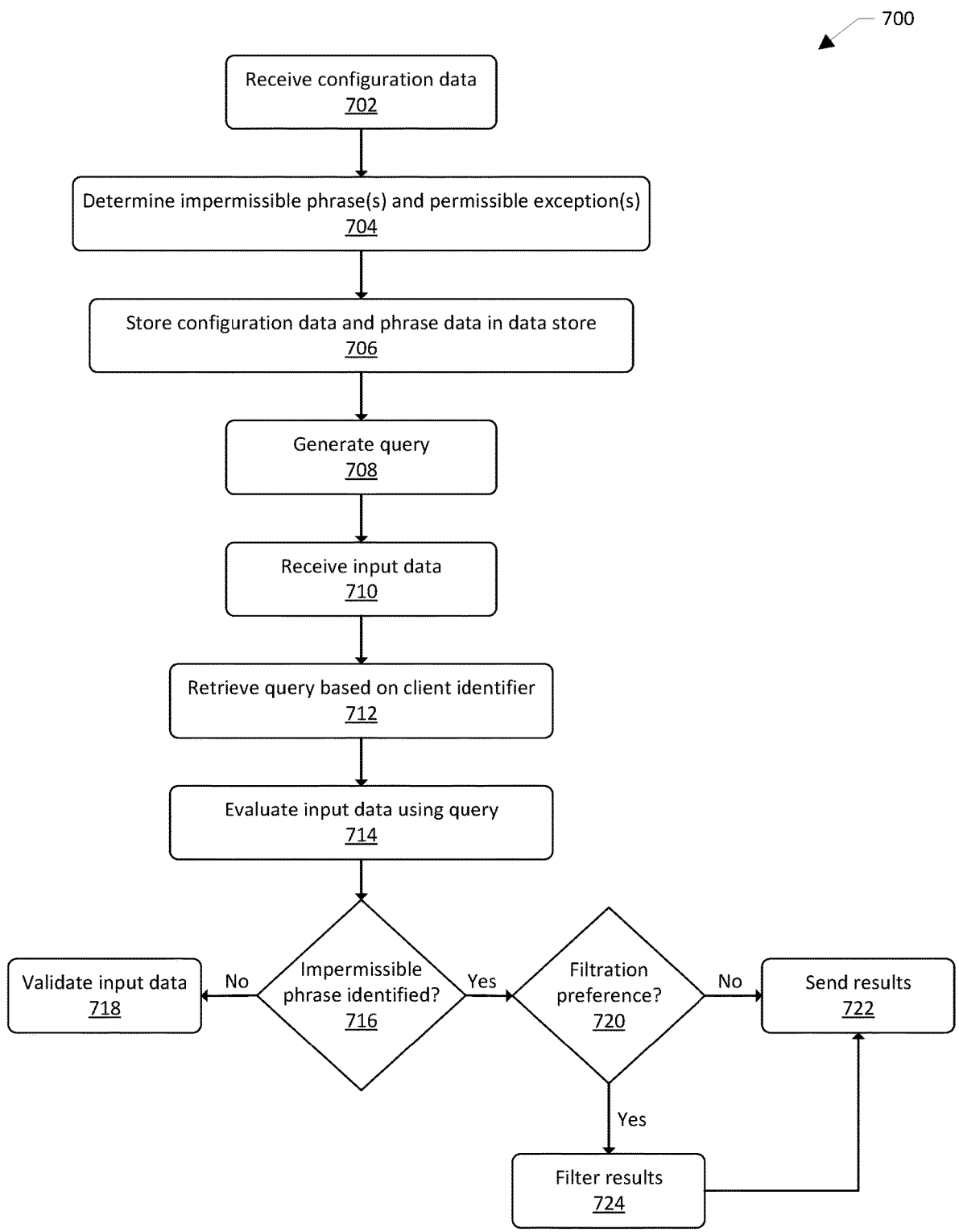
FIG. 7 illustrates a flow diagram of an example process for contextual natural language understanding censoring.
Figure 8:
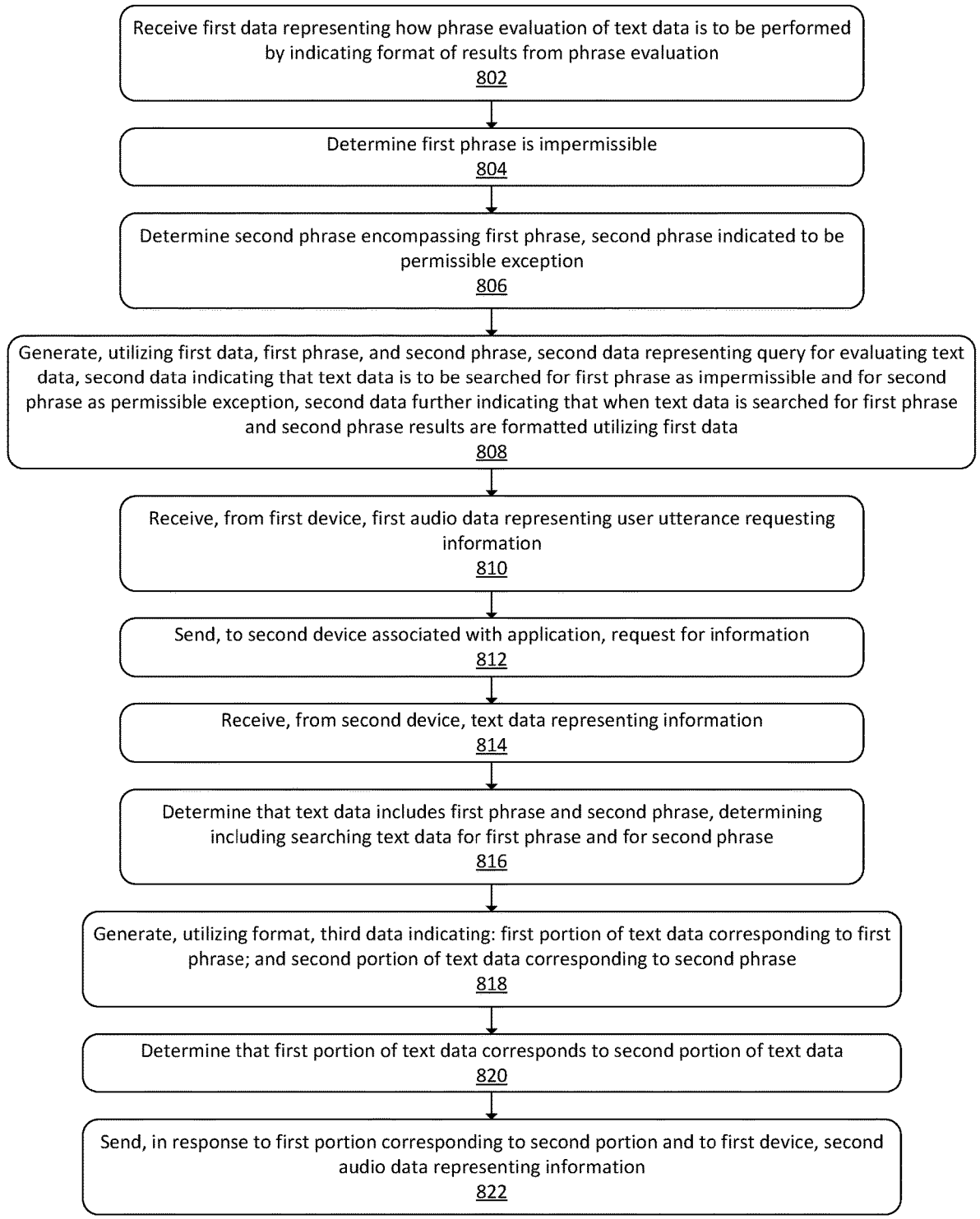
FIG. 8 illustrates a flow diagram of another example process for contextual natural language understanding censoring.
Figure 9:
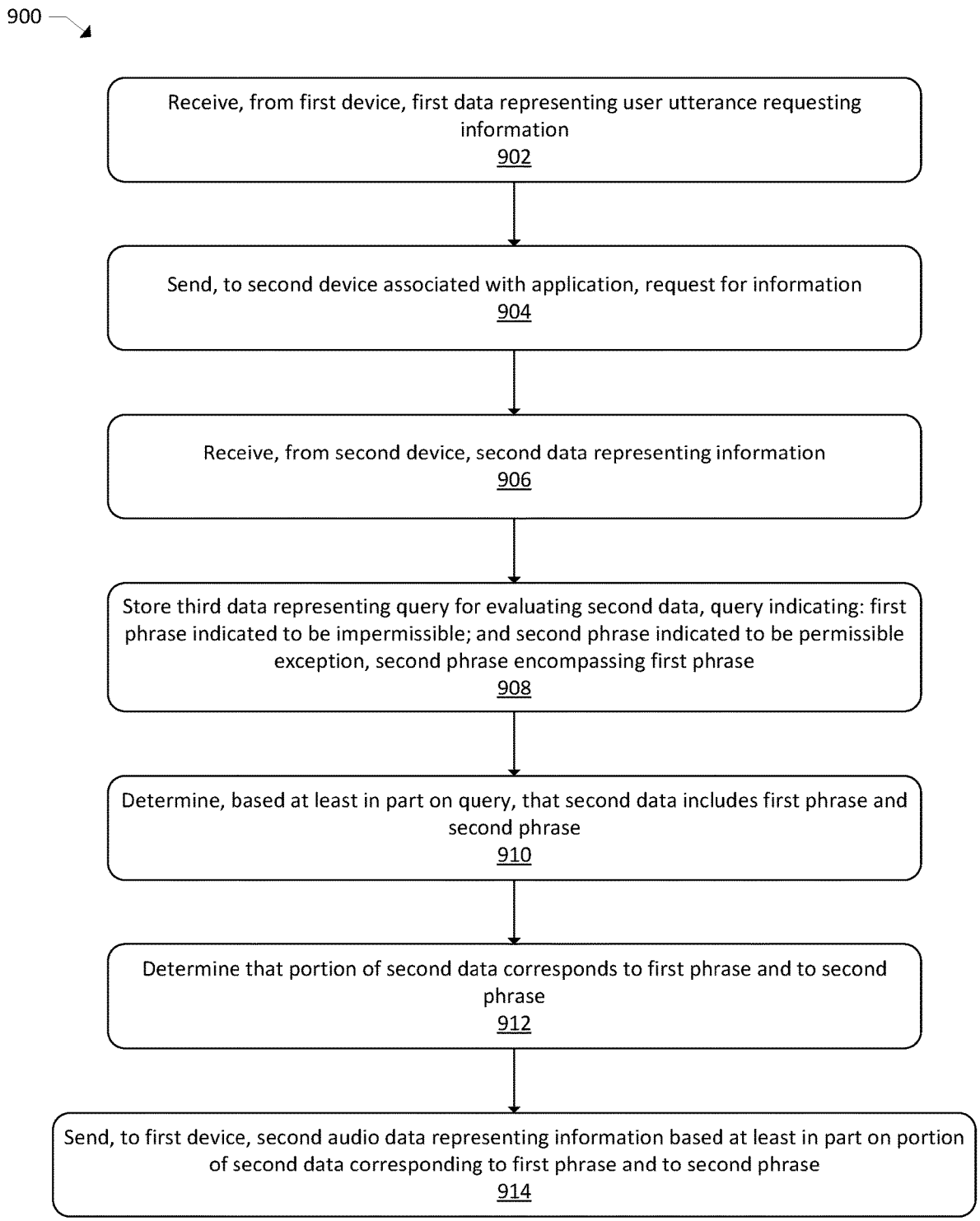
FIG. 9 illustrates a flow diagram of another example process for context natural language understanding censoring.

FIGS. 7-9 illustrates processes for contextual natural language censoring. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-6 and 10, although the processes may be implemented in a wide variety of other environments, architectures and systems.

FIG. 7 illustrates a flow diagram of an example process 700 for contextual natural language understanding censoring. The order in which the operations or steps are described is not intended to be construed as a limitation, and any number of the described operations may be combined in any order and/or in parallel to implement process 700.

At block 702, the process 700 may include receiving configuration data. For example, a client device may provide the configuration data to a configuration component for contextual natural language censoring as described herein. For example, before or upon making an application available to a remote system and/or a voice-enabled device, the client device may be queried for configuration data associated with contextual natural language censoring. This configuration data may include a client identifier that identifies the client and/or client device and/or an input-data type that indicates the type of input data that may be processed by the client device. Examples of input-data types may include customer reviews and/or ratings, responses to requests for information and/or to perform one or more processes, content retrieved by a given client device, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods to be utilized, such as simple notification responses and/or batch responses. The configuration data may also include filtration preferences, such as preferences for filtering phrase-evaluation results. The configuration component may be utilized to receive the configuration data from the client device and/or the configuration component may be configured to identify, determine, and/or generate the configuration data utilizing information received from the client device and/or information about the client device and/or a given application as received from the remote system and/or an external source.

At block 704, the process 700 may include determining one or more impermissible phrases and/or one or more permissible exceptions. For example, the configuration data may be utilized by the phrase-management component to identify and/or determine impermissible phrases and permissible exceptions. For example, based at least in part on the input-data type and/or the language indicator, previously-defined impermissible phrases and permissible exceptions for the same or similar input-data types and/or language identifiers may be utilized. The impermissible phrases may represent phrases that violate one or more policies associated with the application, the client device, the voice-enabled device, and/or the remote system. Such phrases may include those that include curse words, inappropriate and/or explicit content, infringing content, etc. The permissible exceptions may be phrases that are associated with the impermissible phrases but are considered permissible. For example, an impermissible phrase may be "drug." An associated permissible exception may be "drug store," which may be both permissible for a given context and/or category of phrases. A phrase-management component may also be utilized to determine phrase-evaluation preferences, such as whether a phrase will be considered an impermissible phrase or a permissible exception when there is an exact match, a broad-phrase match, a fuzzy match, and/or a phonetic match. The determination of impermissible and permissible exceptions may also include the determination of variances of a given impermissible phrase. For example, the impermissible phrase narcotic may have variances such as coticule and/or arc that may not violate a given content policy. In these examples, the variances may correspond to permissible exceptions. In other examples, a given variance may still violate a content policy and as such may be determined to be an impermissible phrase.

At block 706, the process 700 may include storing the configuration data and phrase data in a data store. For example, the impermissible phrases, permissible exceptions, associated metadata, and/or configuration data may be stored in the data store to be utilized for contextual natural language censoring. The information stored in the data store may be associated with the client identifier and/or an application identifier such that when the information is requested for phrase evaluation of input data associated with a given client device and/or application, relevant information is retrieved.

At block 708, the process 700 may include generating a query. For example, a query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store and/or may be stored in a separate database for contextual natural language censoring operations.

At block 710, the process 700 may include receiving input data. For example, the input data may be received from the client device and/or the voice-enabled device and/or the personal device, in examples. It should be noted that the input data may be received from any computing device and/or system.

At block 712, the process 700 may include retrieving the query based at least in part on client identifier. For example, a phrase evaluator may receive an indication of the client identifier in association with the input data and may utilize the client identifier to determine which queries are to be utilized for phrase evaluation. The queries corresponding to the client identifier may be retrieved and may be utilized to determine whether impermissible phrases and/or permissible exceptions are present in the input data.

At block 714, the process 700 may include evaluating the input data using the query. For example, the phrase evaluator may perform the evaluation of a percolator query corresponding to the input data to identify impermissible phrases and permissible exceptions associated with the input data.

At block 716, the process 700 may include determining whether one or more impermissible phrases are identified in the input data. For example, the phrase evaluator may search the input data for the impermissible phrases and the permissible exceptions and determine which impermissible phrases and/or permissible exceptions are present and which portions of the input data correspond to the impermissible phrases and/or permissible exceptions.

In situations where an impermissible phrase is not identified in the input data, the process 700 may proceed to block 718 where the input data may be validated as complying with one or more content policies. For example, a notification may be sent to the client device indicating that the input data does not contain phrases that violate one or more content policies. In these instances, the input data may be determined to be validated and may be utilized by the remote system.

Returning to block 716, if at least one impermissible phrase is identified in the input data, the process 700 may proceed to block 720 where it may be determined whether one or more filtration preferences are associated with the client identifier and/or the configuration data. For example, a filtration component may receive the evaluation results and may perform one or more filtration processes based at least in part on the filtration preferences described with respect to the configuration data. The configuration data may indicate which filtration preferences, if any, are selected by the client device. In examples, one or more default filtration preferences may be established.

In examples where no filtration preferences are identified, and/or where the filtration preferences indicate that no filtration is to be performed on the evaluation results, then the process 700 may proceed to block 722 where the evaluation results may be sent to one or more computing devices, such as the client device.

Returning to block 720, if one or more filtration preferences are identified, then the process 700 may proceed to block 724 where the evaluation results may be filtered. For example, the filtration preferences may indicate that impermissible phrases, but not permissible exceptions, are to be returned. In still other examples, the filtration preferences may indicate that identified permissible exceptions corresponding to impermissible phrases are to be nullified such that impermissible phrase counts do not include impermissible phrases that correspond to permissible exceptions. In still other examples, the filtration preferences may indicate that the input data is to be rerun through the phrase evaluator after removing permissible exceptions. In this example, the portions of the input data corresponding to permissible exceptions may be removed from the input data and a second instance of the input data without the permissible exceptions may be rerun through the phrase evaluator. The evaluation results from this phrase evaluation may be considered the final results to be returned.

The process 700 may then proceed to block 722 where the filtered evaluation results may be sent to one or more computing devices, such as the client device.

FIG. 8 illustrates a flow diagram of another example process 800 for contextual natural language understanding censoring. The order in which the operations or steps are described is not intended to be construed as a limitation, and any number of the described operations may be combined in any order and/or in parallel to implement process 800.

At block 802, the process 800 may include receiving first data representing how phrase evaluation of text data is to be performed by indicating a format of results from the phrase evaluation. For example, a client device may provide configuration data to a configuration component of a remote system for contextual natural language censoring as described herein. For example, before or upon making an application available to a remote system and/or a voice-enabled device, the client device may be queried for configuration data associated with contextual natural language censoring. This configuration data may include a client identifier that identifies the client and/or client device and/or an input-data type that indicates the type of input data that may be processed by the client device. Examples of input-data types may include customer reviews and/or ratings, responses to requests for information and/or to perform one or more processes, content retrieved by a given client device, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods, otherwise described as results settings, to be utilized, such as simple notification responses and/or batch responses. The configuration data may also include filtration preferences, such as preferences for filtering phrase-evaluation results. The configuration component may be utilized to receive the configuration data from the client device and/or the configuration component may be configured to identify, determine, and/or generate the configuration data utilizing information received from the client device and/or information about the client device and/or a given application as received from the remote system and/or an external source.

At block 804, the process 800 may include determining a first phrase is impermissible. For example, the configuration data may be utilized by the phrase-management component to identify and/or determine impermissible phrases. For example, based at least in part on the input-data type and/or the language indicator, previously-defined impermissible phrases for the same or similar input-data types and/or language identifiers may be utilized. The impermissible phrases may represent phrases that violate one or more policies associated with the application, the client device, the voice-enabled device, and/or the remote system. Such phrases may include those that include curse words, inappropriate and/or explicit content, infringing content, etc. A phrase-management component may also be utilized to determine phrase-evaluation preferences, such as whether a phrase will be considered an impermissible phrase or a permissible exception when there is an exact match, a broad-phrase match, a fuzzy match, and/or a phonetic match.

At block 806, the process 800 may include determining a second phrase encompassing the first phrase, the second phrase indicated to be a permissible exception to the first phrase. For example, the configuration data may be utilized by the phrase-management component to identify and/or determine permissible exceptions. For example, based at least in part on the input-data type and/or the language indicator, previously-defined permissible exceptions for the same or similar input-data types and/or language identifiers may be utilized. The permissible exceptions may be phrases that are associated with the impermissible phrases but are considered permissible exceptions. For example, an impermissible phrase may be "drug." An associated permissible exception may be "drug store," which may be both permissible for a given context and/or category of phrases.

At block 808, the process 800 may include generating, utilizing the first data, the first phrase, and the second phrase, second data representing a query for evaluating the text data, the second data indicating that the text data is to be searched for the first phrase as impermissible and for the second phrase as the permissible exception, the second data further indicating that when the text data is searched for the first phrase and the second phrase the results are formatted utilizing the first data. For example, a query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible exception or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store and/or may be stored in a separate database for contextual natural language censoring operations.

At block 810, the process 800 may include receiving, from a first device, first audio data representing a user utterance requesting information. For example, the first audio data may be received from a voice-enabled device where the microphone(s) of the voice-enabled device may capture audio corresponding to the user utterance and may generate corresponding audio data. The audio data may be sent from the voice-enabled device to a remote system for speech processing.

At block 812, the process 800 may include sending, to a second device associated with an application, a request for the information. For example, for a given request for information, the request may be associated with an application configured to accept such a request and provide relevant information in response to the request. The second device and/or the application may be described as a "skill" and may be separate from the speech processing system, in examples.

At block 814, the process 800 may include receiving, from the second device, text data representing the information. For example, the application may intake the request and determine a response thereto. In these examples, the response may include text data and/or audio data that is responsive to the request. The second device may send the response from the second device to the speech processing system.

At block 816, the process 800 may include determining that the text data includes the first phrase and the second phrase, the determining including searching the text data for the first phrase and for the second phrase. For example, a phrase evaluator may receive an indication of the client identifier in association with the input data and may utilize the client identifier to determine which queries are to be utilized for phrase evaluation. The queries corresponding to the client identifier may be retrieved and may be utilized to determine whether impermissible phrases and/or permissible exceptions are present in the input data. The phrase evaluator may perform the evaluation of a percolator query corresponding to the input data to identify impermissible phrases and permissible exceptions associated with the input data.

At block 818, the process 800 may include generating, utilizing the format, third data indicating: a first portion of the text data corresponding to the first phrase; and a second portion of the text data corresponding to the second phrase. For example, the response setting and/or format of the results may be utilized by a filtration component to generate filtered evaluation results and/or to refrain from filtering the evaluation results from the phrase evaluator.

At block 820, the process 800 may include determining that the first portion of the text data corresponds to the second portion of the text data. For example, when the permissible exception corresponds to a portion of the response that also includes the impermissible phrase, then the system may determine that the impermissible phrase is part of the permissible exception and thus should not be considered impermissible in this circumstance.

At block 822, the process 800 may include sending, in response to the first portion corresponding to the second portion and to the first device, second audio data representing the information. For example, having determined that the response does not contain an impermissible phrase that also corresponds to a permissible exception, the response may be deemed to not violate a content policy associated with the query. In these examples, the response and/or audio data representing and/or including the response may be sent along to the user device, such as the voice-enabled device, for output by the user device.

Additionally, or alternatively, the process 800 may include generating fourth data representing an association between the first phrase and the second phrase, the association indicating that the second phrase encompasses the first phrase. The process 800 may also include identifying a first instance of the first phrase in the text data and identifying a second instance of the first phrase in the text data. The process 800 may also include identifying an instance of the second phrase in the text data and determining, utilizing the association, that the text data corresponding to the first instance of the first phrase also corresponds to the instance of the second phrase. In these examples, the second instance of the first phrase may be considered impermissible and the first instance of the first phrase may be considered a permissible exception.

Additionally, or alternatively, the process 800 may include storing fourth data indicating impermissible phrases associated with an input type and a language, and permissible exceptions associated with the input type and the language. The process 800 may also include determining that the first data indicates that the text data is associated with the input type and the language. In these examples, determining the first phrase indicated to be impermissible may include identifying the first phrase as one of the impermissible phrases associated with the input type and the language. Also, determining the second phrase indicated to be the permissible exception may include identifying the second phrase as one of the permissible exceptions associated with the input type and the language Additionally, or alternatively, the process 800 may include generating, from the third data indicating the second portion of the first text data corresponds to the second phrase, second text data that excludes the second portion of the first text data corresponding to the second phrase. The process 800 may also include determining that the second text data includes the first phrase, the determining including searching the second text data for the first phrase. The process 800 may also include generating fourth data indicating a third portion of the second text data corresponding to the first phrase and sending the fourth data to the second device.

FIG. 9 illustrates a flow diagram of another example process 900 for context natural language understanding censoring. The order in which the operations or steps are described is not intended to be construed as a limitation, and any number of the described operations may be combined in any order and/or in parallel to implement process 900.

At block 902, the process 900 may include receiving, from a first device, first data representing a user utterance requesting information. For example, the first audio data may be received from a voice-enabled device where the microphone(s) of the voice-enabled device may capture audio corresponding to the user utterance and may generate corresponding audio data. The audio data may be sent from the voice-enabled device to a remote system for speech processing. In other examples, the data requesting the information may be input data as provided by a user of the voice-enabled device and/or another device such as a personal device.

At block 904, the process 900 may include sending, to a second device associated with an application, a request for the information. For example, for a given request for information, the request may be associated with an application configured to accept such a request and provide relevant information in response to the request. The second device and/or the application may be described as a "skill" and may be separate from the speech processing system, in examples.

At block 906, the process 900 may include receiving, from the second device, second data representing the information. For example, the application may intake the request and determine a response thereto. In these examples, the response may include text data and/or audio data that is responsive to the request. The second device may send the response from the second device to the speech processing system.

At block 908, the process 900 may include storing third data representing a query for evaluating the second data, the query indicating: a first phrase indicated to be impermissible; and a second phrase indicated to be a permissible exception, the second phrase encompassing the first phrase. For example, a query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible exception or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store and/or may be stored in a separate database for contextual natural language censoring operations.

At block 910, the process 900 may include determining, based at least in part on the query, that the second data includes the first phrase and the second phrase. For example, a phrase evaluator may receive an indication of the client identifier in association with the input data and may utilize the client identifier to determine which queries are to be utilized for phrase evaluation. The queries corresponding to the client identifier may be retrieved and may be utilized to determine whether impermissible phrases and/or permissible exceptions are present in the input data. The phrase evaluator may perform the evaluation of a percolator query corresponding to the input data to identify impermissible phrases and permissible exceptions associated with the input data.

At block 912, the process 900 may include determining that a portion of the second data corresponds to the first phrase and to the second phrase. For example, when the permissible exception corresponds to a portion of the response that also includes the impermissible phrase, then the system may determine that the impermissible phrase is part of the permissible exception and thus should not be considered impermissible in this circumstance.

At block 914, the process 900 may include sending, to the first device, second audio data representing the information based at least in part on the portion of the second data corresponding to the first phrase and to the second phrase. For example, having determined that the response does not contain an impermissible phrase that also corresponds to a permissible exception, the response may be deemed to not violate a content policy associated with the query. In these examples, the response and/or audio data representing and/ or including the response may be sent along to the user device, such as the voice-enabled device, for output by the user device.

The process 900 may also include receiving data indicating a format for results from phrase evaluation of input data. For example, a client device may provide configuration data to a configuration component of a remote system for contextual natural language censoring as described herein. For example, before or upon making an application available to a remote system and/or a voice-enabled device, the client device may be queried for configuration data associated with contextual natural language censoring. This configuration data may include a client identifier that identifies the client and/or client device and/or an input-data type that indicates the type of input data that may be processed by the client device. Examples of input-data types may include customer reviews and/or ratings, responses to requests for information and/or to perform one or more processes, content retrieved by a given client device, etc. The configuration data may also include a language identifier, which may indicate a location, region, and/or language associated with content processed by the application. The language identifier, for example, may indicate that the content is in English or Spanish and/or that the content is associated with the United States of America or Spain. The configuration data may also include a search-index identifier and/or pre-processing preferences. The pre-processing preferences may include pre-processing tasks to be performed in association with the input data prior to phrase evaluation. The pre-processing tasks may include, for example, lemmatization and/or custom tokenization. The configuration data may also include phrase-evaluation request methods to be utilized, such as streaming requests and/or application programming interface (API)-based synchronous invocation. The configuration data may also include phrase-evaluation response methods, otherwise described as results settings, to be utilized, such as simple notification responses and/or batch responses. The configuration data may also include filtration preferences, such as preferences for filtering phrase-evaluation results. The configuration component may be utilized to receive the configuration data from the client device and/or the configuration component may be configured to identify, determine, and/or generate the configuration data utilizing information received from the client device and/or information about the client device and/or a given application as received from the remote system and/or an external source.

The process 900 may also include determining the first phrase indicated to be impermissible. For example, the configuration data may be utilized by the phrase-management component to identify and/or determine impermissible phrases. For example, based at least in part on the input-data type and/or the language indicator, previously-defined impermissible phrases for the same or similar input-data types and/or language identifiers may be utilized. The impermissible phrases may represent phrases that violate one or more policies associated with the application, the client device, the voice-enabled device, and/or the remote system. Such phrases may include those that include curse words, inappropriate and/or explicit content, infringing content, etc. A phrase-management component may also be utilized to determine phrase-evaluation preferences, such as whether a phrase will be considered an impermissible phrase or a permissible exception when there is an exact match, a broad-phrase match, a fuzzy match, and/or a phonetic match.

The process 900 may also include determining the second phrase associated with the first phrase, the second phrase indicated to be a permissible exception. For example, the configuration data may be utilized by the phrase-management component to identify and/or determine permissible exceptions. For example, based at least in part on the input-data type and/or the language indicator, previously-defined permissible exceptions for the same or similar input-data types and/or language identifiers may be utilized. The permissible exceptions may be phrases that are associated with the impermissible phrases but are considered a permissible exception. For example, an impermissible phrase may be "drug." An associated permissible exception may be "drug store," which may be both permissible for a given context and/or category of phrases.

The process 900 may also include generating, based at least in part on the first data, the first phrase, and the second phrase, data representing the query for evaluating the input data. For example, a query generator may retrieve the impermissible phrases, permissible exceptions, metadata, and/or configuration data from the data store and may utilize some or all of this information to generate one or more queries to be utilized for phrase evaluation. The queries may include elastic-search queries where a query domain specific language based on JSON may be utilized to define a given query. The query may represent an abstract syntax tree. For example, the query may indicate the client identifier, the input-data type, the language identifier, a name associated with the query, a mode for aspects of the query, such as permissible exception or impermissible, a category of phrases being considered, such as "illicit material" and/or "content policy," an aggregation type, the phrase at issue, and/or parent phrases, for example. The aggregation type may include an indication of whether all phrases for the phrase at issue must match, whether any of the phrases may match, and/or whether none of the phrases may match. The queries may be stored in the data store and/or may be stored in a separate database for contextual natural language censoring operations.

Additionally, or alternatively, the process 900 may include determining an association between the first phrase and the second phrase and receiving fourth data from the second device. The process 900 may also include identifying a first instance of the first phrase in the fourth data and identifying a second instance of the first phrase in the fourth data. The process 900 may also include identifying an instance of the second phrase in the fourth data and determining, based at least in part on the association, that the first instance of the first phrase is associated with the instance of the second phrase. The process 900 may also include generating fifth data indicating that the second instance of the first phrase is impermissible and the first instance of the first phrase is a permissible exception.

Additionally, or alternatively, the process 900 may include storing fourth data indicating impermissible phrases associated with an input type and a language and permissible exceptions associated with the input type and the language. The process 900 may also include determining that the application is associated with the input type and the language and generating the third data based at least in part on the application being associated with the input type and the language.

Additionally, or alternatively, the process 900 may include generating, based at least in part on the portion of the second data corresponding to the first phrase and to the second phrase, fourth data that excludes the portion of the second data corresponding to the second phrase. The process 900 may also include determining that the first phrase is absent from the fourth data and generating fifth data indicating that the first phrase is absent from the fourth data. The process 900 may also include sending the fifth data to the second device.

Additionally, or alternatively, the process 900 may include determining that the first phrase is associated with a phrase type indicated to be violative of a content policy. The process 900 may also include determining, based at least in part on the first phrase being associated with the phrase type, an application identifier associated with the second device. The process 900 may also include causing the application identifier to be removed from an application list indicating applications to be utilized by the first device.

Additionally, or alternatively, the process 900 may include receiving, from the second device, a request to validate text data associated with the application. The process 900 may also include receiving the text data from the second device and determining, based at least in part the query, that impermissible phrases are absent from the text data. The process 900 may also include sending a response to the second device, the response indicating that the impermissible phrases are absent from the text data.

Additionally, or alternatively, the process 900 may include determining an application category of the application and determining permissible exceptions associated with the application category. The process 900 may also include generating the third data representing the query based at least in part on the permissible exceptions.

Additionally, or alternatively, the process 900 may include determining an association between the first phrase and the second phrase. The process 900 may also include receiving a second request to remove an impermissible phrase from the first query and determining, based at least in part on the association, that the second phrase is to be removed from the first query. The process 900 may also include generating, based at least in part on the request, fourth data excluding the first phrase as impermissible and the second phrase as a permissible exception.

Figure 10:
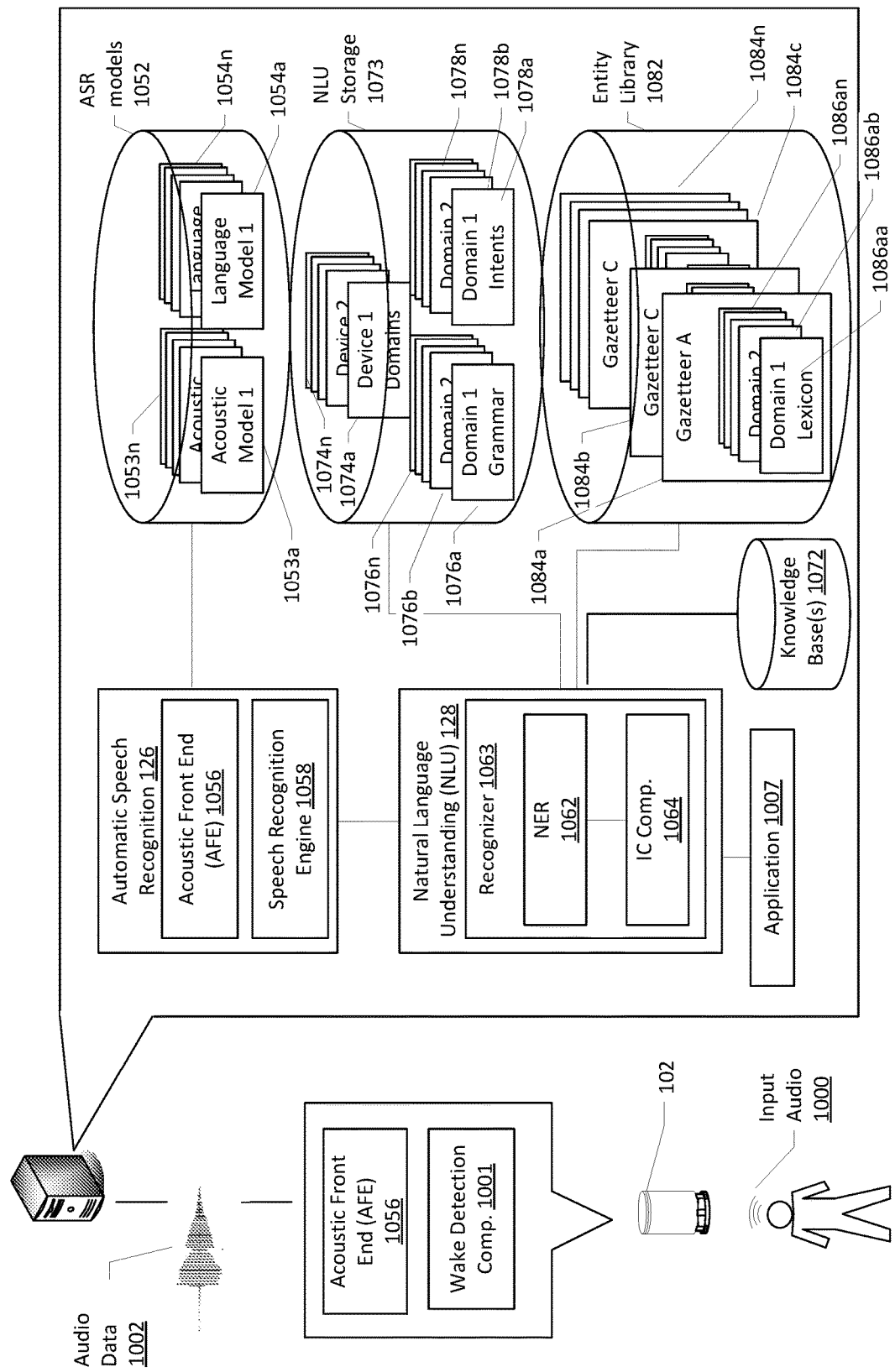
FIG. 10 illustrates a conceptual diagram of components of a speech-processing system for processing audio data provided by one or more devices.

FIG. 10 illustrates a conceptual diagram of how a spoken utterance can be processed, allowing a system to capture and execute commands spoken by a user, such as spoken commands that may follow a wakeword, or trigger expression, (i.e., a predefined word or phrase for "waking" a device, causing the device to begin sending audio data to a remote system, such as system 106). The various components illustrated may be located on a same device or different physical devices. Message between various components illustrated in FIG. 10 may occur directly or across a network 108. An audio capture component, such as a microphone 116 of the device 102, or another device, captures audio 1000 corresponding to a spoken utterance. The device 102, using a wake-word component 1001, then processes audio data corresponding to the audio 1000 to determine if a keyword (such as a wakeword) is detected in the audio data. Following detection of a wakeword, the device 102 sends audio data 1002 corresponding to the utterance to the remote system 106 that includes an ASR component 126. The audio data 1002 may be output from an optional acoustic front end (AFE) 1056 located on the device prior to transmission. In other instances, the audio data 1002 may be in a different form for processing by a remote AFE 1056, such as the AFE 1056 located with the ASR component 126 of the remote system 106.

The wake-word component 1001 works in conjunction with other components of the user device, for example a microphone to detect keywords in audio 1000. For example, the device may convert audio 1000 into audio data, and process the audio data with the wake-word component 1001 to determine whether human sound is detected, and if so, if the audio data comprising human sound matches an audio signature and/or model corresponding to a particular keyword.

The user device may use various techniques to determine whether audio data includes human sound. Some embodiments may apply voice activity detection (VAD) techniques. Such techniques may determine whether human sound is present in an audio input based on various quantitative aspects of the audio input, such as the spectral slope between one or more frames of the audio input: the energy levels of the audio input in one or more spectral bands: the signal-to-noise ratios of the audio input in one or more spectral bands; or other quantitative aspects. In other embodiments, the user device may implement a limited classifier configured to distinguish human sound from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in human sound storage, which acoustic models may include models corresponding to human sound, noise (such as environmental noise or background noise), or silence. Still other techniques may be used to determine whether human sound is present in the audio input.

Once human sound is detected in the audio received by user device (or separately from human sound detection), the user device may use the wake-word component 1001 to perform wakeword detection to determine when a user intends to speak a command to the user device. This process may also be referred to as keyword detection, with the wakeword being a specific example of a keyword. Specifically, keyword detection may be performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake-word component 1001 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment, the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 102 may "wake" and begin transmitting audio data 1002 corresponding to input audio 1000 to the remote system 106 for speech processing. Audio data corresponding to that audio may be sent to remote system 106 for routing to a recipient device or may be sent to the remote system 106 for speech processing for interpretation of the included speech (either for purposes of enabling voice-messages and/or for purposes of executing a command in the speech). The audio data 1002 may include data corresponding to the wakeword, or the portion of the audio data corresponding to the wakeword may be removed by the local device 102 prior to sending.

Further, a local device may "wake" upon detection of speech/spoken audio above a threshold, as described herein. Upon receipt by the remote system 106, an ASR component 126 may convert the audio data 1002 into text. The ASR transcribes audio data into text data representing the words of the speech contained in the audio data 1002. The text data may then be used by other components for various purposes, such as executing system commands, inputting data, etc. A spoken utterance in the audio data is input to a processor configured to perform ASR which then interprets the utterance based on the similarity between the utterance and pre-established language models 1054*a-n* stored in an ASR model knowledge base (ASR Models Storage 1052). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053*a-n* stored in an ASR Models Storage 1052), and the likelihood that a particular word that matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR process 126 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 1056 and a speech recognition engine 1058. The acoustic front end (AFE) 1056 transforms the audio data from the microphone into data for processing by the speech recognition engine 1058. The speech recognition engine 1058 compares the speech recognition data with acoustic models 1053*a-n*, language models 1054*a-n*, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features/qualities of the audio data within the frame. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 1058 may process the output from the AFE 1056 with reference to information stored in speech/model storage (1052). Alternatively, post front-end processed data (such as feature vectors) may be received by the device executing ASR processing from another source besides the internal AFE. For example, the user device may process audio data into feature vectors (for example using an on-device AFE 1056) and transmit that information to a server across a network for ASR processing. Feature vectors may arrive at the remote system 106 encoded, in which case they may be decoded prior to processing by the processor executing the speech recognition engine 1058.

The speech recognition engine 1058 attempts to match received feature vectors to language phonemes and words as known in the stored acoustic models 1053*a-n* and language models 1054*a-n*. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc. By way of example, a user utterance may be "Alexa, what is the title of this song?" The wake detection component may identify the wake word, otherwise described as a trigger expression, "Alexa," in the user utterance and may "wake" based on identifying the wake word. Audio data corresponding to the user utterance may be sent to the remote system 106, where the speech recognition engine 1058 may identify, determine, and/or generate text data corresponding to the user utterance, here "what is the title of this song."

The speech recognition engine 1058 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc. may be sent to the remote system 106, for natural language understanding (NLU) processing, such as conversion of the text into commands for execution, either by the user device, by the remote system 106, or by another device (such as a server running a specific application like a search engine, etc.).

The device performing NLU processing 128 (e.g., server 106) may include various components, including potentially dedicated processor(s), memory, storage, etc. As shown in FIG. 10, an NLU component 156 may include a recognizer 1063 that includes a named entity recognition (NER) component 1062 which is used to identify portions of query text that correspond to a named entity that may be recognizable by the system. A downstream process called named entity resolution links a text portion to a specific entity known to the system. To perform named entity resolution, the system may utilize gazetteer information (1084*a*-1084*n*) stored in entity library storage 1082. The gazetteer information may be used for entity resolution, for example matching ASR results with different entities (such as voice-enabled devices, accessory devices, etc.) Gazetteers may be linked to users (for example a particular gazetteer may be associated with a specific user's device associations), may be linked to certain domains (such as music, shopping, etc.), or may be organized in a variety of other ways.

Generally, the NLU process takes textual input (such as processed from ASR 126 based on the utterance input audio 1000) and attempts to make a semantic interpretation of the text. That is, the NLU process determines the meaning behind the text based on the individual words and then implements that meaning. NLU processing 128 interprets a text string to derive an intent or a desired action from the user as well as the pertinent pieces of information in the text that allow a device (e.g., device 102) to complete that action. For example, if a spoken utterance is processed using ASR 126 and outputs the text "what is the title of this song" the NLU process may determine that the user intended to receive information indicating the title of a song being output by a device 102.

The NLU may process several textual inputs related to the same utterance. For example, if the ASR 126 outputs N text segments (as part of an N-best list), the NLU may process all N outputs to obtain NLU results.

As will be discussed further below, the NLU process may be configured to parse and tag to annotate text as part of NLU processing. For example, for the text "what is the title of this song," "identify title" may be tagged as a command (to identify the title of a song) and "this song" may be tagged as the naming identifier of the song.

To correctly perform NLU processing of speech input, an NLU process 128 may be configured to determine a "domain" of the utterance so as to determine and narrow down which services offered by the endpoint device (e.g., remote system 106 or the user device) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) component 1062 receives a query in the form of ASR results and attempts to identify relevant grammars and lexical information that may be used to construe meaning. To do so, the NLU component 128 may begin by identifying potential domains that may relate to the received query. The NLU storage 1073 includes a database of devices (1074a-1074n) identifying domains associated with specific devices. For example, the user device may be associated with domains for music, telephony, calendaring, contact lists, and device-specific messages, but not video. In addition, the entity library may include database entries about specific services on a specific device, either indexed by Device ID, User ID, or Household ID, or some other indicator.

In NLU processing, a domain may represent a discrete set of activities having a common theme, such as "banking," health care," "smart home." "communications," "shopping." "music," "calendaring." etc. As such, each domain may be associated with a particular recognizer 1063, language model and/or grammar database (1076a-1076n), a particular set of intents/actions (1078a-1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa to 1086an. A user's contact-list lexical information might include the names of contacts. Since every user's contact list is presumably different, this personalized information improves entity resolution.

As noted above, in traditional NLU processing, a query may be processed applying the rules, models, and information applicable to each identified domain. For example, if a query potentially implicates both messages and, for example, music, the query may, substantially in parallel, be NLU processed using the grammar models and lexical information for messages, and will be processed using the grammar models and lexical information for music. The responses based on the query produced by each set of models is scored, with the overall highest ranked result from all applied domains ordinarily selected to be the correct result.

An intent classification (IC) component 1064 parses the query to determine an intent or intents for each identified domain, where the intent corresponds to the action to be performed that is responsive to the query. Each domain is associated with a database (1078a-1078n) of words linked to intents. For example, a communications intent database may link words and phrases such as "identify song." "song title," "determine song." to a "song title" intent. By way of further example, a timer intent database may link words and phrases such as "set," "start," "initiate," and "enable" to a "set timer" intent. A voice-message intent database, meanwhile, may link words and phrases such as "send a message." "send a voice message," "send the following," or the like. The IC component 1064 identifies potential intents for each identified domain by comparing words in the query to the words and phrases in the intents database 1078. In some instances, the determination of an intent by the IC component 1064 is performed using a set of rules or templates that are processed against the incoming text to identify a matching intent.

In order to generate a particular interpreted response, the NER 1062 applies the grammar models and lexical information associated with the respective domain to actually recognize a mention of one or more entities in the text of the query. In this manner, the NER 1062 identifies "slots" or values (i.e., particular words in query text) that may be needed for later command processing. Depending on the complexity of the NER 1062, it may also label each slot with a type of varying levels of specificity (such as noun, place, device name, device location, city, artist name, song name, amount of time, timer number, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with the shopping domain may include a database of words commonly used when people discuss shopping.

The intents identified by the IC component 1064 are linked to domain-specific grammar frameworks (included in 1076) with "slots" or "fields" to be filled with values. Each slot/field corresponds to a portion of the query text that the system believes corresponds to an entity. To make resolution more flexible, these frameworks would ordinarily not be structured as sentences, but rather based on associating slots with grammatical tags. For example, if "song title" is an identified intent, a grammar (1076) framework or frameworks may correspond to sentence structures such as "identify {this song} song title."

For example, the NER component 1062 may parse the query to identify words as subject, object, verb, preposition, etc., based on grammar rules and/or models, prior to recognizing named entities. The identified verb may be used by the IC component 1064 to identify intent, which is then used by the NER component 1062 to identify frameworks. A framework for the intent of "play a song," meanwhile, may specify a list of slots/fields applicable to play the identified "song" and any object modifier (e.g., specifying a music collection from which the song should be accessed) or the like. The NER component 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

The frameworks linked to the intent are then used to determine what database fields should be searched to determine the meaning of these phrases, such as searching a user's gazette for similarity with the framework slots. If the search of the gazetteer does not resolve the slot/field using gazetteer information, the NER component 1062 may search the database of generic words associated with the domain (in the knowledge base 1072). So, for instance, if the query was "identify this song." after failing to determine which song is currently being output, the NER component 1062 may search the domain vocabulary for songs that have been requested lately. In the alternative, generic words may be checked before the gazetteer information, or both may be tried, potentially producing two different results.

The output data from the NLU processing (which may include tagged text, commands, etc.) may then be sent to an application 1007. The destination application 1007 may be determined based on the NLU output. For example, if the NLU output includes a command to send a message, the destination application 1007 may be a message sending application, such as one located on the user device or in a message sending appliance, configured to execute a message sending command. If the NLU output includes a search request, the destination application 1007 may include a search engine processor, such as one located on a search server, configured to execute a search command. After the appropriate command is generated based on the intent of the user, the application 1007 may provide some or all of this information to a text-to-speech (TTS) engine. The TTS engine may then generate an actual audio file for outputting the audio data determined by the application 1007 (e.g., "okay," or "this song title is Song A"). After generating the file (or "audio data"), the TTS engine may provide this data back to the remote system 106.

The NLU operations of existing systems may take the form of a multi-domain architecture. Each domain (which may include a set of intents and entity slots that define a larger concept such as music, books etc. as well as components such as trained models, etc. used to perform various NLU operations such as NER, IC, or the like) may be constructed separately and made available to an NLU component 128 during runtime operations where NLU operations are performed on text (such as text output from an ASR component 126). Each domain may have specially configured components to perform various steps of the NLU operations.

For example, in a NLU system, the system may include a multi-domain architecture consisting of multiple domains for intents/commands executable by the system (or by other devices connected to the system), such as music, video, books, and information. The system may include a plurality of domain recognizers, where each domain may include its own recognizer 1063. Each recognizer may include various NLU components such as an NER component 1062, IC component 1064 and other components such as an entity resolver, or other components.

For example, a messaging domain recognizer 1063-A (Domain A) may have an NER component 1062-A that identifies what slots (i.e., portions of input text) may correspond to particular words relevant to that domain. The words may correspond to entities such as (for the messaging domain) a recipient. An NER component 1062 may use a machine learning model, such as a domain specific conditional random field (CRF) to both identify the portions corresponding to an entity as well as identify what type of entity corresponds to the text portion. The messaging domain recognizer 1063-A may also have its own intent classification (IC) component 1064-A that determines the intent of the text assuming that the text is within the proscribed domain. An IC component may use a model, such as a domain specific maximum entropy classifier to identify the intent of the text, where the intent is the action the user desires the system to perform. For this purpose, the remote system computing device 106 may include a model training component. The model training component may be used to train the classifier(s)/machine learning models discussed above.

As noted above, multiple devices may be employed in a single speech-processing system. In such a multi-device system, each of the devices may include different components for performing different aspects of the speech processing. The multiple devices may include overlapping components. The components of the user device and the remote system 106, as illustrated herein are exemplary, and may be located in a stand-alone device or may be included, in whole or in part, as a component of a larger device or system, may be distributed across a network or multiple devices connected by a network, etc.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A method comprising:
  receiving first data representing a user request for content generated by an application;
  sending the first data to the application;
  receiving second data representing the content from the application;
  generating third data indicating a policy violation schema, the third data identifying:
    a first phrase indicated to be impermissible; and
    a second phrase indicated to be a permissible exception based at least in part on a contextual meaning, the second phrase encompassing the first phrase;
  determining, based at least in part on the third data, that the second data includes the first phrase;

determining a policy violation severity associated with the second data including the first phrase, wherein the policy violation severity is based on the application;

selecting a corrective action to perform on the content generated by the application from multiple corrective actions based at least in part on the policy violation severity, the corrective action including sending a request for the application to generate altered content;

generating the request for the application to generate the altered content based at least in part on selecting the corrective action;

sending the request to the application; and in response to receiving the altered content from the application, causing a selected device to output of the altered content.

2. The method of claim 1, further comprising:
determining permissible exceptions, including the permissible exception, associated with the contextual meaning; and
generating the third data based at least in part on the permissible exceptions.

3. The method of claim 1, further comprising:
receiving fourth data representing a request to validate text data associated with the application;
receiving the text data;
determining that impermissible phrases are absent from the text data; and
outputting a response indicating that the impermissible phrases are absent from the text data.

4. The method of claim 1, further comprising:
determining that the first phrase is associated with a phrase type indicated to be violative of a content policy;
determining, based at least in part on the first phrase being associated with the phrase type, a content identifier associated with a portion of the application; and
causing the content identifier to be removed from an application list indicating portions of the application to be utilized.

5. The method of claim 1, wherein the application is configured to perform the corrective action by generating the altered content that excludes the first phrase.

6. The method of claim 1, further comprising generating, based at least in part on the first data, a request for the content to be generated by the application, the request comprising a natural language representation of the user request along with a command to produce the content.

7. The method of claim 1, further comprising:
storing fourth data indicating:
impermissible phrases associated with an input type; and
permissible exceptions, including the permissible exception, associated with the input type;
determining that the application is associated with the input type; and
generating the third data based at least in part on the application being associated with the input type.

8. The method of claim 1, further comprising:
storing fourth data indicating:
impermissible phrases associated with a language of multiple languages; and
permissible exceptions, including the permissible exception, associated with the language;
determining that the application is associated with the language; and
generating the third data based at least in part on the application being associated with the language.

9. The method of claim 1, wherein:
the application is associated with a language model configured to generate the content in response to user requests; and
sending the first data comprises sending text data representing the first data to the application.

10. The method of claim 1, wherein the user request comprises audio data, and the method further comprises:
generating, utilizing the audio data, text data representing the user request;
generating a command for the application to provide the content utilizing the text data; and
receiving the altered content from the application.

11. A system comprising:
one or more processors; and
non-transitory computer-readable media storing instructions that, when executed by the one or more processors, cause the one or more processors to perform operations comprising:
receiving first data representing a user request for content generated by an application;
sending the first data to the application;
receiving second data representing the content from the application;
generating third data indicating a policy violation schema, the third data identifying:
a first phrase indicated to be impermissible; and
a second phrase indicated to be a permissible exception based at least in part on a contextual meaning, the second phrase encompassing the first phrase;
determining, based at least in part on the third data, that the second data includes the first phrase;
determining a policy violation severity associated with the second data including the first phrase, wherein the policy violation severity is based on the application;
selecting a corrective action to perform on the content generated by the application from multiple corrective actions based at least in part on the policy violation severity, the corrective action including sending a request for the application to generate altered content;
generating the request for the application to generate the altered content based at least in part on selecting the corrective action;
sending the request to the application; and
in response to receiving the altered content from the application, causing a selected device to output of the altered content.

12. The system of claim 11, the operations further comprising:
determining permissible exceptions, including the permissible exception, associated with the contextual meaning; and
generating the third data based at least in part on the permissible exceptions.

13. The system of claim 11, the operations further comprising:
receiving fourth data representing a request to validate text data associated with the application;
receiving the text data;
determining that impermissible phrases are absent from the text data; and
outputting a response indicating that the impermissible phrases are absent from the text data.

14. The system of claim 11, the operations further comprising:
    determining that the first phrase is associated with a phrase type indicated to be violative of a content policy;
    determining, based at least in part on the first phrase being associated with the phrase type, a content identifier associated with a portion of the application; and
    causing the content identifier to be removed from an application list indicating portions of the application to be utilized.

15. The system of claim 11, wherein the application is configured to perform the corrective action by generating the altered content that excludes the first phrase.

16. The system of claim 11, the operations further comprising generating, based at least in part on the first data, a request for the content to be generated by the application, the request comprising a natural language representation of the user request along with a command to produce the content.

17. The system of claim 11, the operations further comprising:
    storing fourth data indicating:
    impermissible phrases associated with an input type; and
    permissible exceptions, including the permissible exception, associated with the input type;
    determining that the application is associated with the input type; and
    generating the third data based at least in part on the application being associated with the input type.

18. The system of claim 11, the operations further comprising:
    storing fourth data indicating:
        impermissible phrases associated with a language of multiple languages; and
        permissible exceptions, including the permissible exception, associated with the language;
    determining that the application is associated with the language; and
    generating the third data based at least in part on the application being associated with the language.

19. The system of claim 11, wherein:
    the application is associated with a language model configured to generate the content in response to user requests; and
    sending the first data comprises sending text data representing the first data to the application.

20. The system of claim 11, wherein the user request comprises audio data, and the operations further comprise:
    generating, utilizing the audio data, text data representing the user request;
    generating a command for the application to provide the content utilizing the text data; and
    receiving the altered content from the application.

* * * * *